United States Patent
Damnjanovic et al.

(10) Patent No.: US 9,432,942 B2
(45) Date of Patent: *Aug. 30, 2016

(54) USING DTX AND DRX IN A WIRELESS COMMUNICATION SYSTEM

(71) Applicant: QUALCOMM Incorporated, San Diego, CA (US)

(72) Inventors: Aleksandar Damnjanovic, Del Mar, CA (US); Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 13/967,234

(22) Filed: Aug. 14, 2013

(65) Prior Publication Data

US 2013/0336186 A1    Dec. 19, 2013

Related U.S. Application Data

(63) Continuation of application No. 12/013,305, filed on Jan. 11, 2008, now Pat. No. 8,755,313.

(60) Provisional application No. 60/884,604, filed on Jan. 11, 2007, provisional application No. 60/888,280, filed on Feb. 5, 2007.

(51) Int. Cl.
*G08C 17/00* (2006.01)
*H04W 52/02* (2009.01)
(Continued)

(52) U.S. Cl.
CPC ...... *H04W 52/0251* (2013.01); *H04L 12/4633* (2013.01); *H04L 45/00* (2013.01);
(Continued)

(58) Field of Classification Search
None
See application file for complete search history.

(56) References Cited

U.S. PATENT DOCUMENTS

| 4,679,244 A | 7/1987 | Kawasaki et al. |
| 4,833,701 A | 5/1989 | Comroe et al. |

(Continued)

FOREIGN PATENT DOCUMENTS

| CA | 2442400 A1 | 11/2002 |
| CN | 1276954 A | 12/2000 |

(Continued)

OTHER PUBLICATIONS

Ericsson: "DRX and DTX in LTE Active," 3GPP Draft; R2-060967, 3rd Generation Partnership Project (3GPP), Mobile Competence Centre; 650, Route Des Lucioles; F-06921 Sophia-Antipolis Cedex; France, vol. RAN WG2. No. Athens Greece; Mar. 23, 2006 XP050130896, pp. 1-5.

(Continued)

*Primary Examiner* — Bunjob Jaroenchonwanit
(74) *Attorney, Agent, or Firm* — Dalei Dong

(57) ABSTRACT

Systems, methodologies, and devices are described that can facilitate reducing power consumption associated with mobile devices. A mobile device can utilize a sleep mode controller that can facilitate selecting and/or switching to a desired sleep mode based in part on predefined sleep mode criteria. The sleep modes can include a non-sleep mode, light sleep mode, and/or deep sleep mode. The mobile device can employ an analyzer to evaluate information related to explicit signals, implicit signals, and/or the current sleep mode to determine whether a condition is met based in part on the predefined sleep mode criteria such that a transition to a different sleep mode is to be performed. If such a condition is met, the sleep mode controller can facilitate transitioning from the current sleep mode to a different sleep mode to facilitate reducing power consumption by the mobile device.

20 Claims, 10 Drawing Sheets

(51) Int. Cl.
  *H04L 12/46* (2006.01)
  *H04L 12/701* (2013.01)
  *H04L 12/723* (2013.01)
  *H04Q 11/00* (2006.01)
  *H04L 29/06* (2006.01)
  *H04W 76/04* (2009.01)

(52) U.S. Cl.
  CPC .............. *H04L 45/50* (2013.01); *H04L 69/14* (2013.01); *H04Q 11/0067* (2013.01); *H04W 52/02* (2013.01); *H04Q 11/0071* (2013.01); *H04Q 2011/0077* (2013.01); *H04W 52/0206* (2013.01); *H04W 52/0216* (2013.01); *H04W 52/0229* (2013.01); *H04W 52/0245* (2013.01); *H04W 76/048* (2013.01); *Y02B 60/50* (2013.01)

(56) References Cited

U.S. PATENT DOCUMENTS

| | | | |
|---|---|---|---|
| 4,901,307 A | 2/1990 | Gilhousen et al. |
| 5,056,109 A | 10/1991 | Gilhousen et al. |
| 5,095,529 A | 3/1992 | Comroe et al. |
| 5,128,938 A | 7/1992 | Borras |
| 5,267,261 A | 11/1993 | Blakeney, II et al. |
| 5,311,543 A | 5/1994 | Schreiber |
| 5,325,432 A | 6/1994 | Gardeck et al. |
| 5,369,781 A | 11/1994 | Comroe et al. |
| 5,387,905 A | 2/1995 | Grube et al. |
| 5,420,909 A | 5/1995 | Ng et al. |
| 5,450,405 A | 9/1995 | Maher et al. |
| 5,461,645 A | 10/1995 | Ishii |
| 5,463,617 A | 10/1995 | Grube et al. |
| 5,465,391 A | 11/1995 | Toyryla |
| 5,473,605 A | 12/1995 | Grube et al. |
| 5,491,835 A | 2/1996 | Sasuta et al. |
| 5,511,232 A | 4/1996 | O'dea et al. |
| 5,513,381 A | 4/1996 | Sasuta |
| 5,542,108 A | 7/1996 | Sasuta |
| 5,566,366 A | 10/1996 | Russo et al. |
| 5,590,396 A | 12/1996 | Henry |
| 5,594,948 A | 1/1997 | Talarmo et al. |
| 5,610,559 A | 3/1997 | Dent |
| 5,623,511 A | 4/1997 | Bar-David et al. |
| 5,625,882 A | 4/1997 | Vook et al. |
| 5,627,882 A | 5/1997 | Chien et al. |
| 5,634,197 A | 5/1997 | Paavonen |
| 5,710,982 A | 1/1998 | Laborde et al. |
| 5,720,455 A | 2/1998 | Kull et al. |
| 5,771,224 A | 6/1998 | Seki et al. |
| 5,809,401 A | 9/1998 | Meidan et al. |
| 5,809,419 A | 9/1998 | Schellinger et al. |
| 5,815,531 A | 9/1998 | Dent |
| 5,831,479 A | 11/1998 | Leffel et al. |
| 5,844,894 A | 12/1998 | Dent |
| 5,867,060 A | 2/1999 | Burkett, Jr. et al. |
| 5,884,196 A | 3/1999 | Lekven et al. |
| 5,923,651 A | 7/1999 | Struhsaker |
| 5,982,760 A | 11/1999 | Chen |
| 5,991,635 A | 11/1999 | Dent et al. |
| 5,999,818 A | 12/1999 | Gilbert et al. |
| 6,021,123 A | 2/2000 | Mimura |
| 6,078,815 A | 6/2000 | Edwards |
| 6,108,542 A | 8/2000 | Swanchara et al. |
| 6,108,560 A | 8/2000 | Navaro et al. |
| 6,125,148 A | 9/2000 | Frodigh et al. |
| 6,125,150 A | 9/2000 | Wesel et al. |
| 6,160,791 A | 12/2000 | Bohnke |
| 6,167,270 A | 12/2000 | Rezaiifar et al. |
| 6,185,259 B1 | 2/2001 | Dent |
| 6,201,785 B1 | 3/2001 | Fouche et al. |
| 6,222,851 B1 | 4/2001 | Petry |
| 6,226,280 B1 | 5/2001 | Roark et al. |
| 6,230,022 B1 | 5/2001 | Sakoda et al. |
| 6,239,690 B1 | 5/2001 | Burbidge et al. |
| 6,243,584 B1 | 6/2001 | O'byrne |
| 6,259,685 B1 | 7/2001 | Rinne et al. |
| 6,266,529 B1 | 7/2001 | Chheda |
| 6,275,712 B1 | 8/2001 | Gray et al. |
| 6,307,849 B1 | 10/2001 | Tiedemann, Jr. |
| 6,308,080 B1 | 10/2001 | Burt et al. |
| 6,321,095 B1 | 11/2001 | Gavette |
| 6,334,047 B1 | 12/2001 | Andersson et al. |
| 6,347,081 B1 | 2/2002 | Bruhn |
| 6,377,803 B1 | 4/2002 | Ruohonen |
| 6,385,261 B1 | 5/2002 | Tsuji et al. |
| 6,396,803 B2 | 5/2002 | Hornsby et al. |
| 6,400,703 B1 | 6/2002 | Park et al. |
| 6,408,038 B1 | 6/2002 | Takeuchi |
| 6,424,678 B1 | 7/2002 | Doberstein et al. |
| 6,442,152 B1 | 8/2002 | Park et al. |
| 6,456,604 B1 | 9/2002 | Lee et al. |
| 6,456,627 B1 | 9/2002 | Frodigh et al. |
| 6,470,030 B1 | 10/2002 | Park et al. |
| 6,473,624 B1 | 10/2002 | Corbett et al. |
| 6,496,543 B1 | 12/2002 | Zehavi |
| 6,498,934 B1 | 12/2002 | Muller |
| 6,538,985 B1 | 3/2003 | Petry et al. |
| 6,546,252 B1 | 4/2003 | Jetzek et al. |
| 6,553,019 B1 | 4/2003 | Laroia et al. |
| 6,563,881 B1 | 5/2003 | Sakoda et al. |
| 6,574,211 B2 | 6/2003 | Padovani et al. |
| 6,587,510 B1 | 7/2003 | Minami et al. |
| 6,609,008 B1 | 8/2003 | Whang et al. |
| 6,611,506 B1 | 8/2003 | Huang et al. |
| 6,657,988 B2 | 12/2003 | Toskala et al. |
| 6,661,771 B1 | 12/2003 | Cupo et al. |
| 6,690,936 B1 | 2/2004 | Lundh |
| 6,694,147 B1 | 2/2004 | Viswanath et al. |
| 6,721,267 B2 | 4/2004 | Hiben et al. |
| 6,721,289 B1 | 4/2004 | O'toole et al. |
| 6,731,939 B1 | 5/2004 | Watanabe et al. |
| 6,765,893 B1 | 7/2004 | Bayley |
| 6,788,963 B2 | 9/2004 | Laroia et al. |
| 6,799,038 B2 | 9/2004 | Gopikanth |
| 6,801,759 B1 | 10/2004 | Saifuddin |
| 6,804,521 B2 | 10/2004 | Tong et al. |
| 6,904,283 B2 | 6/2005 | Li et al. |
| 6,952,454 B1 | 10/2005 | Jalali et al. |
| 6,961,569 B2 | 11/2005 | Raghuram et al. |
| 6,961,582 B2 | 11/2005 | Su et al. |
| 6,961,595 B2 | 11/2005 | Laroia et al. |
| 6,967,937 B1 | 11/2005 | Gormley |
| 6,978,149 B1 | 12/2005 | Morelli et al. |
| 6,999,799 B1 | 2/2006 | Almassy |
| 7,029,511 B2 | 4/2006 | Ichikawa et al. |
| 7,054,296 B1 | 5/2006 | Sorrells et al. |
| 7,069,319 B2 | 6/2006 | Zellner et al. |
| 7,085,595 B2 | 8/2006 | Kitchin |
| 7,098,821 B2 | 8/2006 | Husted et al. |
| 7,123,662 B2 | 10/2006 | Li et al. |
| 7,142,864 B2 | 11/2006 | Laroia et al. |
| 7,143,299 B1 | 11/2006 | Rubinstein et al. |
| 7,158,804 B2 | 1/2007 | Kumaran et al. |
| 7,162,265 B2 | 1/2007 | Ormson et al. |
| 7,203,158 B2 | 4/2007 | Oshima et al. |
| 7,209,524 B2 | 4/2007 | Chen |
| 7,218,948 B2 | 5/2007 | Laroia et al. |
| 7,257,103 B2 | 8/2007 | Yeh et al. |
| 7,269,145 B2 | 9/2007 | Koo et al. |
| 7,277,498 B2 | 10/2007 | Hanaoka et al. |
| 7,295,840 B2 | 11/2007 | Ormson |
| 7,302,227 B2 | 11/2007 | Sakoda |
| 7,317,750 B2 | 1/2008 | Shattil |
| 7,318,185 B2 | 1/2008 | Khandani et al. |
| 7,321,569 B2 | 1/2008 | Takagi et al. |
| 7,356,103 B2 | 4/2008 | Nishikawa |
| 7,362,736 B2 | 4/2008 | Suzuki |
| 7,363,039 B2 | 4/2008 | Laroia et al. |
| 7,391,819 B1 | 6/2008 | Von Der Embse |
| 7,398,111 B2 | 7/2008 | Laroia et al. |
| 7,403,472 B2 | 7/2008 | Okada et al. |
| 7,411,895 B2 | 8/2008 | Laroia et al. |

(56) References Cited

U.S. PATENT DOCUMENTS

| | | |
|---|---|---|
| 7,420,939 B2 | 9/2008 | Laroia et al. |
| 7,450,926 B2 | 11/2008 | Chang et al. |
| 7,480,234 B1 | 1/2009 | Hart et al. |
| 7,512,424 B2 | 3/2009 | Hossain et al. |
| 7,522,553 B2 | 4/2009 | Kang et al. |
| 7,522,672 B2 | 4/2009 | Saed |
| 7,542,437 B1 | 6/2009 | Redi et al. |
| 7,558,572 B2 | 7/2009 | Anigstein |
| 7,587,001 B2 | 9/2009 | Hazani et al. |
| 7,620,021 B1 | 11/2009 | Chen et al. |
| 7,620,395 B2 | 11/2009 | Yamashita et al. |
| 7,627,770 B2 | 12/2009 | Jones |
| 7,652,978 B2 | 1/2010 | Kim et al. |
| 7,653,035 B2 | 1/2010 | Lin et al. |
| 7,668,573 B2 | 2/2010 | Laroia et al. |
| 7,706,456 B2 | 4/2010 | Laroia et al. |
| 7,720,112 B2 | 5/2010 | Morris |
| 7,746,896 B2 | 6/2010 | Venkatachalam |
| 7,778,643 B2 | 8/2010 | Laroia et al. |
| 7,817,996 B2 | 10/2010 | Brunner |
| 7,925,291 B2 | 4/2011 | Anigstein et al. |
| 8,094,595 B2 | 1/2012 | Montojo et al. |
| 8,099,099 B2 | 1/2012 | Laroia et al. |
| 8,190,163 B2 | 5/2012 | Laroia et al. |
| 8,315,662 B2 | 11/2012 | Anigstein et al. |
| 8,374,613 B2 | 2/2013 | Laroia et al. |
| 8,553,595 B2 | 10/2013 | Laroia et al. |
| 8,593,932 B2 | 11/2013 | Laroia et al. |
| 2001/0031639 A1 | 10/2001 | Makipaa |
| 2001/0034236 A1 | 10/2001 | Tong et al. |
| 2002/0012334 A1 | 1/2002 | Strawczynski et al. |
| 2002/0031189 A1 | 3/2002 | Hiben et al. |
| 2002/0077152 A1 | 6/2002 | Johnson et al. |
| 2002/0090942 A1 | 7/2002 | Karabinis et al. |
| 2002/0136157 A1 | 9/2002 | Takaoka et al. |
| 2002/0145985 A1 | 10/2002 | Love et al. |
| 2002/0172165 A1 | 11/2002 | Rosen et al. |
| 2003/0037033 A1 | 2/2003 | Nyman et al. |
| 2003/0053524 A1 | 3/2003 | Dent |
| 2003/0086379 A1 | 5/2003 | Terry et al. |
| 2003/0086381 A1 | 5/2003 | Terry et al. |
| 2003/0090993 A1 | 5/2003 | Sato |
| 2003/0117969 A1 | 6/2003 | Koo et al. |
| 2003/0129971 A1 | 7/2003 | Gopikanth |
| 2003/0148785 A1 | 8/2003 | Mangal et al. |
| 2003/0152059 A1 | 8/2003 | Odman |
| 2003/0153344 A1 | 8/2003 | Su et al. |
| 2003/0189997 A1 | 10/2003 | Shanbhag et al. |
| 2003/0232619 A1 | 12/2003 | Fraser |
| 2003/0232631 A1 | 12/2003 | Ohmori |
| 2004/0005904 A1 | 1/2004 | Wolf et al. |
| 2004/0062274 A1 | 4/2004 | Hakansson et al. |
| 2004/0086027 A1 | 5/2004 | Shattil |
| 2004/0097231 A1 | 5/2004 | Marque-Pucheu |
| 2004/0100897 A1 | 5/2004 | Shattil |
| 2004/0102202 A1 | 5/2004 | Kumaran et al. |
| 2004/0116110 A1 | 6/2004 | Amerga et al. |
| 2004/0184567 A1 | 9/2004 | McDonough et al. |
| 2004/0189603 A1 | 9/2004 | Arrigo et al. |
| 2004/0203727 A1 | 10/2004 | Abiri et al. |
| 2004/0203838 A1 | 10/2004 | Joshi et al. |
| 2004/0205198 A1 | 10/2004 | Zellner et al. |
| 2004/0219925 A1 | 11/2004 | Ahya et al. |
| 2004/0224684 A1 | 11/2004 | Dorsey et al. |
| 2004/0224689 A1 | 11/2004 | Raghuram et al. |
| 2004/0229610 A1 | 11/2004 | Yamashita et al. |
| 2004/0229625 A1 | 11/2004 | Laroia et al. |
| 2004/0235474 A1 | 11/2004 | Ormson et al. |
| 2004/0248572 A1 | 12/2004 | Ormson |
| 2005/0002326 A1 | 1/2005 | Ling et al. |
| 2005/0002461 A1 | 1/2005 | Giannakis et al. |
| 2005/0002463 A1 | 1/2005 | Sakamoto |
| 2005/0018784 A1 | 1/2005 | Kurobe et al. |
| 2005/0036441 A1 | 2/2005 | Laroia et al. |
| 2005/0047357 A1 | 3/2005 | Benveniste |
| 2005/0049013 A1 | 3/2005 | Chang et al. |
| 2005/0054302 A1 | 3/2005 | Hanaoka et al. |
| 2005/0058089 A1 | 3/2005 | Vijayan et al. |
| 2005/0058115 A1 | 3/2005 | Levin et al. |
| 2005/0105593 A1 | 5/2005 | Dateki et al. |
| 2005/0118981 A1 | 6/2005 | Laroia et al. |
| 2005/0129009 A1 | 6/2005 | Kitchin |
| 2005/0136960 A1 | 6/2005 | Timus et al. |
| 2005/0147190 A1 | 7/2005 | Nishikawa |
| 2005/0153751 A1 | 7/2005 | Bultan et al. |
| 2005/0169166 A1 | 8/2005 | Okada et al. |
| 2005/0176436 A1 | 8/2005 | Mantravadi et al. |
| 2005/0181799 A1 | 8/2005 | Laroia et al. |
| 2005/0233710 A1 | 10/2005 | Lakkis et al. |
| 2006/0023666 A1 | 2/2006 | Jalali et al. |
| 2006/0080344 A1 | 4/2006 | McKibben et al. |
| 2006/0087993 A1 | 4/2006 | Sengupta et al. |
| 2006/0093067 A1 | 5/2006 | Jalali et al. |
| 2006/0114813 A1 | 6/2006 | Seki et al. |
| 2006/0120269 A1 | 6/2006 | Kim et al. |
| 2006/0172747 A1 | 8/2006 | Mohammed |
| 2006/0194577 A1 | 8/2006 | Su |
| 2006/0203713 A1 | 9/2006 | Laroia et al. |
| 2006/0234740 A1 | 10/2006 | Sakoda |
| 2006/0246840 A1 | 11/2006 | Borowski et al. |
| 2006/0262739 A1 | 11/2006 | Ramirez et al. |
| 2006/0269005 A1 | 11/2006 | Laroia et al. |
| 2007/0025283 A1 | 2/2007 | Koslov |
| 2007/0042775 A1 | 2/2007 | Umatt et al. |
| 2007/0082696 A1 | 4/2007 | Wang |
| 2007/0173202 A1 | 7/2007 | Binder et al. |
| 2007/0189259 A1 | 8/2007 | Sollenberger et al. |
| 2007/0201346 A1 | 8/2007 | Geile et al. |
| 2007/0207815 A1 | 9/2007 | Alfano et al. |
| 2007/0223365 A1 | 9/2007 | Tsfaty et al. |
| 2007/0230403 A1 | 10/2007 | Douglas et al. |
| 2007/0242764 A1 | 10/2007 | Anigstein et al. |
| 2007/0259673 A1 | 11/2007 | Willars et al. |
| 2007/0286080 A1 | 12/2007 | Kim et al. |
| 2007/0291728 A1 | 12/2007 | Dalsgaard et al. |
| 2007/0291863 A1 | 12/2007 | Saed |
| 2008/0013468 A1 | 1/2008 | Anigstein et al. |
| 2008/0027586 A1 | 1/2008 | Hern et al. |
| 2008/0046132 A1 | 2/2008 | Dalsgaard et al. |
| 2008/0101268 A1 | 5/2008 | Sammour et al. |
| 2008/0102880 A1 | 5/2008 | Gholmieh et al. |
| 2008/0123576 A1 | 5/2008 | Son et al. |
| 2008/0130543 A1 | 6/2008 | Singh et al. |
| 2008/0146146 A1 | 6/2008 | Binder et al. |
| 2008/0165698 A1 | 7/2008 | Dalsgaard et al. |
| 2008/0182580 A1 | 7/2008 | Laroia et al. |
| 2008/0212710 A1 | 9/2008 | Boehlke et al. |
| 2008/0261530 A1 | 10/2008 | Gerstenberger et al. |
| 2008/0285488 A1 | 11/2008 | Walton et al. |
| 2008/0285669 A1 | 11/2008 | Walton et al. |
| 2008/0285670 A1 | 11/2008 | Walton et al. |
| 2009/0005095 A1 | 1/2009 | Chun et al. |
| 2009/0122736 A1 | 5/2009 | Damnjanovic et al. |
| 2009/0245241 A1 | 10/2009 | Martin |
| 2009/0274084 A1 | 11/2009 | Terry et al. |
| 2010/0027502 A1 | 2/2010 | Chen et al. |
| 2010/0029212 A1 | 2/2010 | Malladi et al. |
| 2010/0093363 A1 | 4/2010 | Malladi |
| 2010/0118747 A9 | 5/2010 | Anigstein et al. |
| 2010/0130220 A1 | 5/2010 | Laroia et al. |
| 2010/0182942 A1 | 7/2010 | Kim et al. |
| 2010/0234059 A1 | 9/2010 | Yang et al. |
| 2010/0262404 A1 | 10/2010 | Bertness |
| 2010/0267420 A1 | 10/2010 | Chou |
| 2011/0142150 A1 | 6/2011 | Anigstein et al. |
| 2011/0195697 A1 | 8/2011 | Kim et al. |
| 2013/0150055 A1 | 6/2013 | Laroia et al. |

FOREIGN PATENT DOCUMENTS

| | | |
|---|---|---|
| CN | 1277760 A | 12/2000 |
| DE | 2330263 | 1/1975 |
| EP | 0923202 | 6/1999 |
| EP | 0961515 A1 | 12/1999 |

(56) References Cited

FOREIGN PATENT DOCUMENTS

| EP | 0986278 | A1 | 3/2000 |
|---|---|---|---|
| EP | 1022920 | A2 | 7/2000 |
| EP | 1079578 | | 2/2001 |
| EP | 1361686 | | 11/2003 |
| EP | 1499144 | A1 | 1/2005 |
| EP | 1592176 | A1 | 11/2005 |
| JP | 06511371 | | 12/1994 |
| JP | 8162998 | | 6/1996 |
| JP | 10112695 | | 4/1998 |
| JP | 10135893 | A | 5/1998 |
| JP | 10313286 | | 11/1998 |
| JP | 11178050 | | 7/1999 |
| JP | 11196043 | A | 7/1999 |
| JP | 2001111522 | | 4/2001 |
| JP | 2005260906 | A | 9/2005 |
| KR | 20000011693 | A | 2/2000 |
| KR | 100414932 | B1 | 12/2003 |
| RU | 2122288 | C1 | 11/1998 |
| RU | 2168277 | | 5/2001 |
| RU | 2005102111 | | 10/2005 |
| TW | 200415887 | | 8/2004 |
| WO | WO-9626620 | A1 | 8/1996 |
| WO | WO-9627993 | A1 | 9/1996 |
| WO | WO-9712475 | A1 | 4/1997 |
| WO | WO-9746038 | | 12/1997 |
| WO | WO-9938278 | | 7/1999 |
| WO | WO-0010353 | A1 | 2/2000 |
| WO | WO-0030328 | A1 | 5/2000 |
| WO | WO-0038457 | A1 | 6/2000 |
| WO | WO-0067394 | A2 | 11/2000 |
| WO | WO-0074292 | | 12/2000 |
| WO | WO-0119114 | A1 | 3/2001 |
| WO | WO-03001726 | | 1/2003 |
| WO | WO-03065628 | | 8/2003 |
| WO | WO-2004071020 | A1 | 8/2004 |
| WO | WO-2004075442 | | 9/2004 |
| WO | WO-2004098093 | A1 | 11/2004 |
| WO | WO-2004105337 | A1 | 12/2004 |
| WO | WO-2007025138 | A2 | 3/2007 |

OTHER PUBLICATIONS

European Search Report—EP12174555—Search Authority—The Hague—Nov. 25, 2013.
Nokia: "Active mode DRX details," 3GPP Draft; R2-070243, Active Mode DRX Details, 3rd Generation Partnership Project (3GPP), Mobile Competence Centre; 650, Route Des Lucioles; F-06921 Sophia-Antipolis Cedex; France, vol. RAN WG2. No. Sorrento. Italy; Jan. 10, 2007, XP050133339, pp. 1-10.
Texas Instruments: "Contention-Free Preamble-Based Synchronized RACH: Comparison with other solutions," 3GPP Draft; R1-070260_SRACMP, 3rd Generation Partnership Project (3GPP), Mobile Competence Centre; 650. Route Des Lucioles; F-06921 Sophia-Antipolis Cedex; France vol. RAN WG1. No. Sorrento. Italy; Jan. 10, 2007, XP050104297, pp. 9.
ZTE: "MAC state transition," 3GPP Draft; R2-060064, 3rd Generation Partnership Project (3GPP), Mobile Competence Centre; 650, Route Des Lucioles ; F-06921 Sophia-Antipolis Cedex; France, vol. RAN WG2, No. Sophia Anti polis, France; Jan. 5, 2006, XP050130225, pp. 2.
Co-pending U.S. Appl. No. 08/144,901, filed Oct. 28, 1993.
Cover, T.M. "Broadcast Channels" IEEE Transactions on Information Theory, IEEE Inc., New York, US, vol. IT-18, No. 1, Jan. 1972, pp. 2-14, XP000760860, ISSN: 0018-9448.
ETSI TS123 122 v7.3.0: Digital cellular telecommunications system (Phase 2+); Universal Mobile Telecommunications System (UMTS); Non-Access-Stratum (NAS) functions related to Mobile Station (MS) in idle mode (3GPP TS 23.122 version 7.3.0 Release 7); ETSI Standards, European Telecommunication Standards Institute, Sophia-Antipolis Cedex, FR, (Sep. 2005), XP014032445.
European Search Report—EP10010369, Search Authority—Munich Patent Office, Feb. 22, 2011.
European Search Report—EP12001311—Search Authority—Berlin—Apr. 11, 2012.
Goldsmith, Andrea. "Multiuser Capacity of Cellular Time-Varying Channels," Signals, Systems and Computers; 1994. 1994 Conference Record of the Twenty-Eighth Asilomar Conference in Pacific Grove, CA, USA Oct. 31-Nov. 2, 1994, Los Alamitos, CA, USA, IEEE Comput. Soc, US, vol. 1, (Oct. 31, 1994), pp. 83-88, XP010148618 ISBN: 978-0-8186-6405-2, p. 85, left-hand column.
International Preliminary Report on Patentability—PCT/US04/004947, International Search Authority—US, Aug. 19, 2005.
International Preliminary Report on Patentability—PCT/US2004/004700, The International Bureau of WIPO—Geneva, Switzerland, Sep. 16, 2005.
International Preliminary Report on Patentability—PCT/US2006/008010, International Search Authority—European Patent Office—Berlin—Feb. 9, 2007.
International Preliminary Report on Patentability—PCT/US2006/008012, International Search Authority—The International Bureau of WIPO—Feb. 9, 2007.
International Search Report—PCT/US03/024772, International Search Authority—U. S. Patent Office, Mar. 11, 2004.
International Search Report—PCT/US03/024940, International Searching Authority—US, Jan. 9, 2004.
International Search Report—PCT/US04/004947, International Search Authority—US, Aug. 24, 2004.
International Search Report—PCT/US07/063517, International Search Authority—European Patent Office—Nov. 15, 2007.
International Search Report—PCT/US2003/024889, International Search Authority—U. S. Patent Office, Dec. 5, 2003.
International Search Report—PCT/US2004/004700, International Search Authority—US, Aug. 10, 2005.
International Search Report and Written Opinion—PCT/US07/073380, International Search Authority—European Patent Office—Dec. 11, 2007.
International Search Report PCT/US03/025832—International Search Authority—United States Patent Office Aug. 13, 2003.
International Search Report—PCT/US2008/050927, International Search Authority—European Patent Office—Jun. 25, 2008.
International Search Report—PCT/US2006/008012,International Search Authority—European Patent Office—Jul. 4, 2006.
Jianming, Zhu et al.: "Ergodic Capacities for Downlink of MC-CDMA System with Different Detection and Resource Allocation Strategies," Conference Record of the 36th Asilomar Conference on Signals, Systems, & Computers. Pacific Grove, CA, Nov. 3-6, 2002; [Asilomar Conference on Signals, Systems and Computers], New York, NY IEEE, US, vol. 2, (Nov. 3, 2002), pp. 1458-1462, XP010638439, ISBN: 978-0-7803-7576-5, p. 1461, right-hand column, paragraph 1.
Notification of Transmittal of The International Search Report and The Written Opinion of The International Searching Authority with International Search Report and Written Opinion of The International Searching Authority, pp. 1-11, dated Jul. 4, 2006, from PCT/US2006/008010.
PCT International Search Report, for International Application No. PCT/US04/04947, Feb. 19, 2004.
Pradhan, S. Sandeep et al.: "Efficient Layered Video Delivery Over Multicarrier Systems Using Optimized Embedded Modulation," Image Processing, 1997. Proceedings., International Conference on Santa Barbara, CA, USA Oct. 26-29, 1997, Los Alamitos, CA, USA, IEEE Comput. Soc, US, vol. 3, (Oct. 26, 1997), pp. 452-455, XP010253736, ISBN: 978-0-8186-8183-7, p. 452, right-hand column, paragraphs 1,2 and p. 454, section 3.3.
Supplementary European Search Report—EP04712817, Search Authority—Berlin Patent Office—Apr. 24, 2009.
Supplementary European Search Report—EP03785063—Search Authority—Munich—Apr. 12, 2006.
Supplementary European Search Report—EP03785063, Search Authority—Munich Patent Office—Apr. 12, 2006.
Supplementary European Search Report—EP03818352, Search Authority—The Hague Patent Office, Dec. 16, 2010.
Supplementary European Search Report—EP04712896, Search Authority—Munich Patent Office, Apr. 30, 2009.

(56) References Cited

OTHER PUBLICATIONS

Supplementary European Search Report EP03785015—Search Authority—Munich Patent Office—Aug. 12, 2009.
Supplementary Partial European Search Report—EP03785063—Search Authority—Munich—Apr. 12, 2006.
Taiwan Search Report—TW095107785—TIPO—Jan. 31, 2012.
Translation of Office Action in Korean application 10-2009-7016733 corresponding to U.S. Appl. No. 12/013,305, dated Feb. 15, 2011.
Written Opinion—PCT/US04/004947, International Search Authority—US, Aug. 24, 2004.
Written Opinion—PCT/US2004/004700, International Search Authority—US, Aug. 10, 2005.
Written Opinion—PCT/US2007/063517, International Search Authority, European Patent Office, Nov. 15, 2007.
Written Opinion—PCT/US2006/008012, International Search Authority—European Patent Office—Jul. 4, 2006.
Written Opinion—PCT/US2008/050927, International Search Authority—European Patent Office—Jun. 25, 2008.

USING DTX AND DRX IN A WIRELESS COMMUNICATION SYSTEM

CROSS-REFERENCE TO RELATED APPLICATIONS

This application is a Continuation of U.S. Ser. No. 12/013,305, filed Jan. 11, 2008, entitled USING DTX AND DRX IN A WIRELESS COMMUNICATION SYSTEM, which claims priority to U.S. Provisional Patent application Ser. No. 60/884,604 filed Jan. 11, 2007, entitled A METHOD AND APPARATUS FOR USING DTX-DRX MODES IN A WIRELESS COMMUNICATION SYSTEM and U.S. Provisional Patent application Ser. No. 60/888,280, filed Feb. 5, 2007, entitled A METHOD AND APPARATUS FOR USING DTX AND DRX IN A WIRELESS COMMUNICATION SYSTEM, the entirety of the aforementioned applications are herein incorporated by reference.

BACKGROUND

I. Field

The following description relates generally to wireless communications, and more particularly to utilizing varying sleep modes to facilitate reducing power consumption by a communication device in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Third Generation Partnership Project (3GPP) Long-Term Evolution (LTE) systems, Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. This communication link can be established via a single-in-single-out, multiple-in-signal-out, or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In a TDD system, the forward and reverse link transmissions can be on the same frequency region so that the reciprocity principle allows the estimation of the forward link channel from the reverse link channel. This can enable the access point to extract transmit beamforming gain on the forward link when multiple antennas are available at the access point Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Typically, mobile devices utilize power (e.g., battery power) while turned on as well as during periods of communication with a base station and/or other mobile devices via the base station. The amount of power consumed by a mobile device can depend in part on the configuration of the mobile device and/or function (e.g., operation) being performed by the mobile device. Reducing the amount of power utilized by a mobile device is desirable as such reduction can result in extended battery life and decreased cost to use the mobile device and battery.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating a reduction in power consumption in a communication device (e.g., mobile device) by employing various sleep modes in the communication device. A mobile device can utilize a sleep mode controller that can facilitate selecting and/or switching to a desired sleep mode based in part on predefined sleep mode criteria. The sleep modes can include a non-sleep mode, light sleep mode, and/or deep sleep mode, for example. The mobile device can employ an analyzer that can operate in conjunction with the sleep mode controller to evaluate information relevant to determining sleep mode transitions, such as explicit signals (e.g., message from base station instructing a change in sleep mode), implicit signals (e.g., no data exchanges between the mobile device and base station for a predetermined period of time), the current sleep mode state, and/or available sleep mode states in order to determine whether a condition is met based in part on the predefined sleep mode criteria such that a transition to a different sleep mode is to be performed. If such a condition is met, the sleep mode controller can facilitate transitioning from the current sleep mode to a different sleep mode to facilitate reducing power consumption by the mobile device.

According to related aspects, a method that facilitates selecting a sleep mode associated with a mobile device is described herein. The method can include signaling to facilitate selection of a sleep mode. Further, the method can comprise selecting a sleep mode based in part on a predefined sleep mode criteria.

Another aspect relates to a wireless communications apparatus. The wireless communications apparatus can include a memory that retains instructions related to selecting a sleep mode based in part on a predefined sleep mode criteria. Further, the wireless communications apparatus can include a processor, coupled to the memory, configured to execute the instructions retained in the memory.

Yet another aspect relates to a wireless communications apparatus that facilitates selection of a sleep mode. The wireless communications apparatus can include means for signaling to facilitate the selection of a sleep mode. Further, the wireless communications apparatus can comprise means for selecting a sleep mode based in part on a predefined sleep mode criteria.

Still another aspect relates to a machine-readable medium having stored thereon machine-executable instructions for signaling to facilitate a transition from a first sleep mode to another sleep mode; and selecting a sleep mode based in part on a predefined sleep mode criteria.

In accordance with another aspect, an apparatus in a wireless communication system can include a processor, wherein the processor can be configured to signal to select a sleep mode when a condition is met based in part on a predefined sleep mode criteria. Moreover, the processor can be configured to select a sleep mode based in part on the predefined sleep mode criteria.

According to other aspects, a method that facilitates sleep mode transitions associated with a mobile device is described herein. The method can include evaluating information related to sleep mode transitions associated with the mobile device. Moreover, the method can include transmitting a signal to facilitate a transition from a first sleep mode to another sleep mode based in part on a predefined sleep mode criteria.

Yet another aspect relates to a wireless communications apparatus that can include a memory that retains instructions related to signaling associated with selecting a sleep mode, and selecting a sleep mode associated with a mobile device based in part on a predefined sleep mode criteria. Further, the wireless communications apparatus can comprise a processor, coupled to the memory, configured to execute the instructions retained in the memory.

Another aspect relates to a wireless communications apparatus that facilitates selection of a sleep mode associated with a mobile device in a wireless communication environment. The wireless communications apparatus can include means for signaling to facilitate selecting a sleep mode. Moreover, the wireless communications apparatus can include means for selecting a sleep mode based in part on a predefined sleep mode criteria.

Still another aspect relates to a machine-readable medium having stored thereon machine-executable instructions for evaluating information associated with transitioning to a particular sleep mode based in part on a predefined sleep mode criteria, and signaling a transition to the particular sleep mode when a condition for transition associated with the predefined sleep mode criteria is met.

In accordance with another aspect, an apparatus in a wireless communication system can include a processor, wherein the processor can be configured to evaluate information associated with sleep mode transitions based in part on a sleep mode criteria. Further, the processor can be configured to select a sleep mode associated with a mobile device. Moreover, the processor can be configured to transmit at least one signal associated with a transition from a first sleep mode to a disparate sleep mode. The processor can additionally be configured to schedule data exchanges associated with the mobile device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
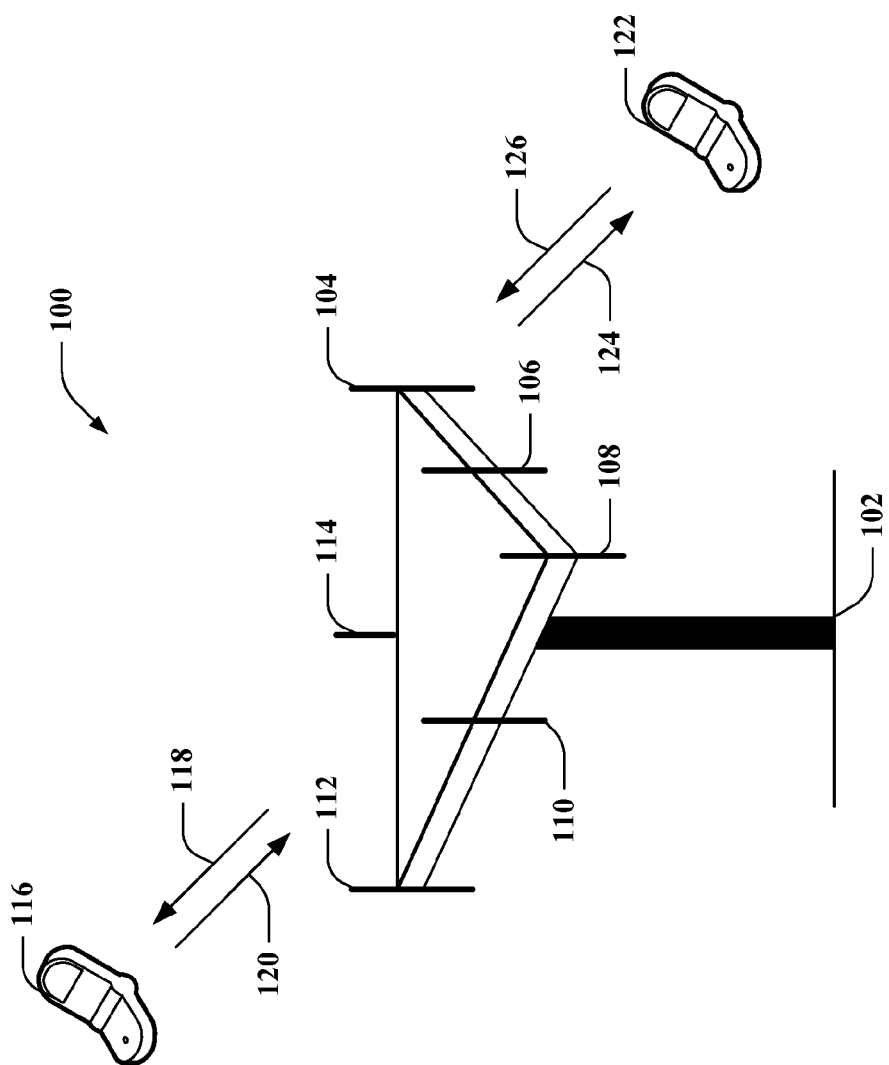
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like can refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices (e.g., 116) in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

In accordance with an aspect, a mobile device (e.g., 116) can be configured so that such mobile device can transition (e.g., switch) between different modes, such as deep sleep (DS) mode, light sleep (LS) mode, and/or continuous reception (CRX) mode based in part on predefined sleep mode criteria. In one aspect, the mobile device (e.g., 116) can have cycles (e.g., discontinuous transmission (DTX)) where each cycle can include an "on" period where the mobile device can monitor transmissions from the base station 102 and/or an "off" period where the radio frequency (RF) generation can be turned off in the mobile device to facilitate reducing power consumption. The length of a particular cycle associated with a particular mode can be based in part on the total length of a respective "off" period combined with a respective "on" period within the cycle. Thus, for example, since the "off" period associated with DS mode can be longer than the "off" period associated with LS mode, the DRX cycle for DS mode can be longer in length than the DRX cycle for LS mode. In one aspect, the DS mode can have a cycle (e.g., DRX cycle) with a specified "off" period associated with discontinuous reception (DRX) that can be longer than the specified "off" period for a cycle associated with the LS mode or the specified "off" period for a cycle associated with the CRX mode (e.g., which can have its "off" period set to 0) to facilitate reducing power consumption (e.g., reduce use of battery power). During the "off" period, the mobile device (e.g., 116) can turn off (e.g., deactivate) its RF generation (for example, where there is also a discontinuous transmission (DTX) period as well), where during the "off" period the mobile device is not able to receive data or control information, in order to facilitate reducing power consumption. The DS mode also can have a specified "off" period associated with DTX that can be longer than the "off" period associated with the LS mode or the CRX mode (e.g., which can have its "off" period set to 0) to facilitate reducing power consumption. The DS mode can further have a specified "on" period of time during a cycle, where the "on" period can occur less frequently than an "on" period for the LS mode, and where the mobile device (e.g., 116) can receive certain information (e.g., control information) during such "on" periods. The DS mode can also have a specified "on" period of time during a DTX cycle. While in DS mode, the mobile device (e.g., 116) is not able to transmit data via the data channel, but can receive and/or transmit control information via the control channel during the "on" period (e.g., "on" intervals). In order to exchange data with the base station 102, the mobile device (e.g., 116) has to transition out of DS mode to either LS mode or CRX mode.

The LS mode can have a different cycle than the DS mode, as the "off" period associated with DRX, as compared to the DS mode, can be a shorter length of time than the "off" period associated with DRX of the DS mode. The LS mode also can have a defined "off" period associated with DTX that can be shorter than the "off" period associated with DTX of the DS mode. The LS mode can further have a defined "on" period of time related to DRX, which can occur more frequently than the "on" periods for the DS mode (but can occur less frequently than the CRX mode, which can be "on" continuously to receive information), where data and/or control information can be received during such non-DRX slots. The LS mode can have a defined "on" period of time associated with DTX. While in LS mode, the mobile device (e.g., 116) can transmit and/or receive data via the data channel and/or control information via the control channel. In the LS mode, the mobile device (e.g., 116) can facilitate reducing power consumption, although the reduction in power consumption typically will not be as great as the reduction in power consumption while in the DS mode.

In the CRX mode, the mobile device (e.g., 116) can be in a state where it is "on" (e.g., in non-DRX mode) at all times while in such mode, and is able to receive data and/or control information. That is, in the CRX mode, the "off" period can be set to 0 so that there is no "off period" during a cycle. In accordance with an embodiment, the CRX mode (e.g., non-sleep mode) can be considered a special mode associated with the LS mode, where, for the CRX mode, the "off" period can be set to 0, where the cycle can be made up of a series of "on" slots, for example, so that the mobile device (e.g., 116) can be in an "on" state continuously. Thus, the LS mode can be configured so that the "off" period is set to 0, and the mobile device (e.g., 116) can be in an "on" state continuously. While in the CRX mode, the mobile device (e.g., 116) typically can consume more power than when the mobile device is in the LS mode or DS mode.

The length of an "off" period (e.g., respectively associated with DRX and DTX) can be configurable, as desired, and can range from 0, which can be associated with the CRX mode, for instance, to a desired number of seconds (e.g., 2 seconds), where the length of the "off" period typically can be larger for DS mode than LS mode. The length of an "on" period (e.g., respectively associated with DRX and DTX) can be configurable, as desired, and can range from 1 ms to more than 1 ms. The respective lengths of an "off" period and/or an "on" period can be based in part on the type of mode (e.g., DS mode, LS mode, CRX mode). The base station 102 can schedule and/or process data transmissions between the base station 102 and the mobile device (e.g., 116) when the mobile device is in an "on" period (e.g., "on" slot), except that while in DS mode the mobile device (e.g., 116) cannot exchange data with the base station 102, but can exchange control information with the base station 102.

Each of the DS mode, LS mode, and CRX mode can be further configured based in part on respective CQI attributes, respective sounding reference signal (SRS) attributes, respective measurement events, and/or respective timer values, where the timer values can be utilized to facilitate determining when the mobile device (e.g., 116) is to transition from one mode to another mode. For example, CQI attributes can be configured or updated based in part on type of sleep mode, or transition from one sleep mode to another sleep mode.

With regard to the predefined sleep mode criteria, such criteria can relate to, for example, an explicit signal (e.g., control message) from the base station 102 indicating and/or directing the mobile device (e.g., 116) to transition from one mode to another mode (e.g., from LS mode to DS mode), and/or an implicit signal (e.g., lack of data communication associated with the mobile device for a predetermined period of time or more). The mobile device (e.g., 116) can monitor and analyze received information, such as control messages, data messages, and/or information regarding the length of time between events (e.g., receiving or sending a data transmission or control information), and/or the type of events that occur, and can control the selection of, and/or the switching between, the different modes based in part on the predefined sleep mode criteria. The mobile device (e.g., 116) also can track the length of time between events to facilitate determining whether the predetermined period of time has elapsed between particular events so as to trigger a transition from one mode to another mode. The mobile device (e.g., 116) can transition to LS mode or DS mode based in part on the predefined sleep mode criteria to facilitate reducing power consumption. As a result, the mobile device (e.g., 116) can facilitate reducing power consumption as compared to conventional mobile devices.

In one aspect, when the mobile device (e.g., 116) is in DS mode, an implicit signal to transition from DS mode to the LS mode can include receiving information regarding a downlink data transmission, such as a scheduling of a downlink data transmission from the base station 102 to the mobile device (e.g., 116), or accessing or scheduling an uplink data transmission (e.g., scheduled uplink transmission), and upon the occurrence of any of the aforementioned events, the predefined sleep mode criteria can indicate that the mobile device is to transition from DS mode to LS mode. The mobile device (e.g., 116) can transition from DS mode to LS mode upon the occurrence of any such event(s) based in part on the predefined sleep mode criteria.

If in the DS mode, a mobile device (e.g., 116) can still transmit uplink control signals at predefined time instances (e.g., during "on" periods). The mobile device (e.g., 116) can also remain in DS mode if it receives "special" control information via the control channel (e.g., PDCCH). For example, while in the DS mode, the mobile device (e.g., 116) can receive power control information, Layer 1 (e.g., physical layer)/Layer 2 (e.g., data link layer) (L1/L2) control channel message, or Up/Down commands. For instance, when the mobile device (e.g., 116) receives information, the mobile device (e.g., 116) can signal to the base station 102 that only the L1/L2 control is successfully decoded (e.g., where the downlink data transmission is not successfully decoded), and the signal can be a negative acknowledgement (NAK); or the mobile device can signal that both the L1/L2 control and scheduled downlink (e.g., of data) are successfully decoded, which can be an acknowledgement (ACK).

As an example of another implicit signal, while the mobile device (e.g., 116) is in the LS mode, if the mobile device does not exchange (e.g., transmit and/or receive) data with the base station 102 for a predetermined amount of time, the predefined sleep mode criteria can specify that the mobile device is to transition from LS mode to DS mode, and the mobile device can switch from the LS mode to the DS mode, to facilitate reducing power consumption in the mobile device. The mobile device (e.g., 116) can be configured such that the implicit signals for the transitions from DS mode to LS mode, and from LS mode to DS mode, associated with the DRX can correspond with or be constrained with the transitions from DS mode to LS mode, and from LS mode to DS mode, associated with the DTX, or the transitions respectively associated with the DRX and DTX can be configured without regard to the other. Where the mobile device (e.g., 116) is accessing in DS mode associated with DRX, the mobile device typically is not able to transition out of DS mode until it receives implicit or explicit confirmation regarding access from the base station 102.

Still another example of an implicit signal can relate to transitioning between CRX mode and LS mode. While the mobile device (e.g., 116) is in the CRX mode, if the mobile device (e.g., 116) does not exchange (e.g., transmit and/or receive) data with the base station 102 for a predetermined amount of time, the predefined sleep mode criteria can specify that the mobile device is to transition from CRX mode to LS mode, and the mobile device can switch from the CRX mode to the LS mode, to facilitate reducing power consumption in the mobile device.

With regard to explicit signal, an explicit signal can include a L1/L2 control message, and/or an L1/L2 control message and a scheduled downlink of data (e.g., L1/L2 control channel+DL SCH), sent from the base station 102 to the mobile device (e.g., 116), where the predefined sleep mode criteria can provide that upon receiving such explicit signal, the mobile device is to transition from DS mode to LS mode (e.g., with regard to DRX and/or DTX), and the mobile device can transition from DS mode to LS mode. An explicit signal can be generated by the base station 102 and sent to the mobile device (e.g., 116), for instance, when the base station 102 knows that there will be no data exchanges, and/or there has been no data exchanges, between the base station 102 and the mobile device for a predefined period of time based in part on the predefined sleep mode criteria. The base station 102 also can track the amount of time that has elapsed between data exchanges with the mobile device (e.g., 116) to facilitate determining whether a predefined period of time has elapsed between data exchanges.

As another example of an explicit signal, an explicit signal can also include a L1/L2 control message, and/or an L1/L2 control message and a scheduled downlink of data, sent from the base station 102 to the mobile device (e.g., 116), where the predefined sleep mode criteria can provide that upon receiving such explicit signal, the mobile device is to transition from LS mode to DS mode (e.g., with regard to DRX and/or DTX), and the mobile device can transition from LS mode to DS mode.

Another example of an explicit signal can relate to transitioning from/to CRX mode to/from LS mode or DS mode. Such an explicit signal can include a L1/L2 control message, and/or an L1/L2 control message and a scheduled downlink of data, sent from the base station 102 to the mobile device (e.g., 116), where the predefined sleep mode criteria can provide that upon receiving such explicit signal, the mobile device is to transition from/to CRX mode to/from LS mode or DS mode (e.g., with regard to DRX and/or DTX), and the mobile device can transition from/to CRX mode to/from the desired mode (e.g., LS mode, DS mode), as specified in the message providing the explicit signal.

In accordance with another aspect, the mobile device (e.g., 116) can be configured to send CQI information. The CQI offset can range from 0 to several slots, for example. It can be desirable to synchronize the uplinks when sending CQI information. CQI typically cannot be sent if the "off" period (e.g., associated with DRX) is a significant period of time (e.g., 2 seconds or more) and there is a possibility for losing synchronization. It can also be desirable to be power controlled when sending of CQI information, as there can be little benefit of sending CQI if the probability of successful decoding at the base station 102 is low. To facilitate power control, an additional broadband reference signal can be provided with the CQI. For instance, SRS can be employed when sending CQI from the mobile device (e.g., 116) to the base station 102. The CQI information can be utilized by the base station 102 to facilitate determining the proper data transmission rates between the base station 102 and the mobile device (e.g., 116), as a channel with a higher quality indicator typically can support a higher data transmission rate than a channel with a lower quality indicator.

In one embodiment, the mobile device (e.g., 116) can employ CRX mode, LS mode, and DS mode (e.g., DRX and/or DTX). Such embodiment of the subject innovation can result in substantial reduction in power consumption by the mobile device (e.g., 116), as compared to conventional mobile devices, while also providing suitable support for certain applications, such as gaming or Voice over Internet Protocol (VoIP), for instance. The mobile device can transition between LS mode and DS mode (e.g., DRX and/or DTX) based in part on explicit signaling and/or implicit signaling. Explicit signaling can also be utilized to facilitate transitioning to and/or from CRX mode (e.g., with regard to DRX and/or DTX).

In accordance with another embodiment, the mobile device (e.g., 116) can employ CRX mode and LS mode (e.g., DRX and/or DTX). As a result there can be a reduction in power consumption (e.g., by transitioning into LS mode) by the mobile device (e.g., 116), as compared to conventional mobile devices, while also providing suitable support for certain applications, such as gaming or VoIP, for example. Transitions between the CRX mode and LS mode can be performed using explicit signaling and/or implicit signaling.

In accordance with yet another embodiment, the mobile device (e.g., 116) can employ CRX mode and DS mode (e.g., DRX and/or DTX). As a result there can be a significant reduction in power consumption (e.g., by transitioning into DS mode) by the mobile device (e.g., 116), as compared to conventional mobile devices. Transitions between the CRX mode and DS mode can be performed using explicit signaling and/or implicit signaling, for example.

Figure 2:
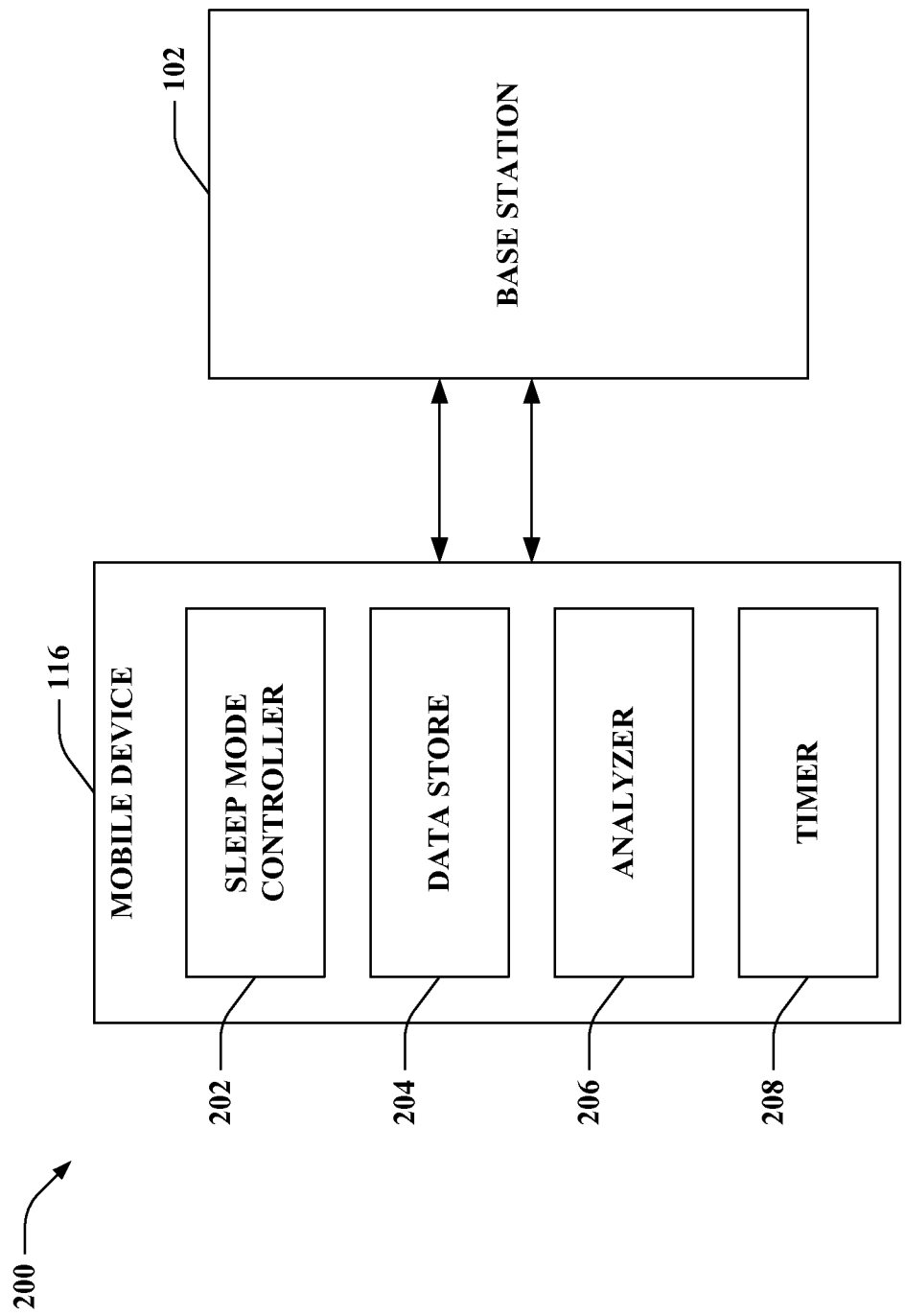
FIG. 2 is an illustration of an example system that can facilitate transitions between different sleep modes associated with a mobile device within a wireless communication environment.

With reference to FIG. 2, illustrated is a system 200 that can facilitate transitions between different sleep modes associated with a mobile device within a wireless communication environment. System 200 includes a base station 102 that can communicate with one or more mobile devices, such as mobile device 116. It is to be appreciated and understood that only one mobile device is depicted in FIG. 2 for clarity and brevity. Moreover, base station 102 can communicate with other base station(s) and/or any disparate devices (e.g., servers) (not shown) that can perform functions such as, for example, authentication, authorization, accounting, billing, and so forth. The base station 102 and mobile device 116 each can be respectively the same or similar as, and/or can comprise respectively the same or similar functionality as, respective components as more fully described herein, such as, for example, with regard to system 100.

Mobile device 116 can be communicatively connected (e.g., wireless connection) with the base station 102, where the connection can comprise a data channel and a control channel. The data channel can facilitate transmission of data between the mobile device 116 and the base station 102, and the control channel can facilitate the transmission of control information between the mobile device and the base station 102.

In one aspect, the mobile device 116 can include a sleep mode controller 202 that can facilitate transitioning the mobile device 116 between the various sleep modes, such as DS mode, LS mode, and/or CRX mode (e.g., with regard to DRX and DTX) based in part on predefined sleep mode criteria that can be stored in data store 204. The sleep mode controller 202 can facilitate retrieving information associated with the predefined sleep mode criteria from the data store 204, and can provide the predefined sleep mode criteria to an analyzer component 206 that can evaluate received information regarding activity (e.g., data exchanges associated with the mobile device 116) and can compare such received information with the predefined sleep mode criteria to facilitate determining whether the mobile device 116 is to transition from one mode to another mode.

It will be appreciated that the data store 204 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

The mobile device 116 can further include a timer 208 that can track the amount of time that has elapsed between the occurrence of events, such as, for instance, the amount of time that has elapsed between data exchanges associated with the mobile device 116. The timer 208 can provide information regarding the elapsed time between events to the sleep mode controller 202 and/or the analyzer 206 in order to facilitate determining whether the mobile device 116 has been inactive with respect to data exchanges for a predetermined amount of time or more, where such predetermined amount of time can be specified by the predefined sleep mode criteria, and where there can be disparate predetermined amounts of time employed with regard to the different types of transitions (e.g., one predetermined amount of time associated with determining whether to transition from CRX mode to LS mode; a disparate predetermined amount of time associated with determining whether to transition between LS mode and DS mode) and/or different types of transmissions (e.g., reception of data, transmission of data).

For example, the mobile device 116 can be in CRX mode, and the analyzer component 206 can receive time information from timer 208 indicating that there has not been a data exchange between the mobile device 116 and the base station 102 for two seconds. The analyzer 206 can compare such time information with the predefined sleep mode criteria, which in this example, can specify that the mobile device 116 is to be transitioned from CRX mode to LS mode if two or more seconds has elapsed since the last data exchange. The analyzer 206 can determine that the predefined sleep mode criteria has been met to transition from CRX mode to LS mode, and can communicate that determination to the sleep mode controller 202. The sleep mode controller 202 can facilitate transitioning (e.g., switching) the mobile device 116 from CRX mode to LS mode based in part on the determination and/or predefined sleep mode criteria. The elapsed time that meets the predefined sleep mode criteria for transitioning from CRX mode to LS mode can be an implicit signal to perform such transition.

As another example, a mobile device 116 can be in LS mode. The mobile device 116 can receive an explicit signal, such as an L1/L2 control channel or L1/L2 control+DL SCH, from the base station 102 that indicates that the mobile device 116 is to transition from the LS mode to the DS mode. Such message can be provided to the analyzer 206, which can compare the received message with the predefined sleep mode criteria, where such criteria can specify that a LS mode to DS mode transition should be performed upon receiving such a message, and the analyzer 206 can determine that there is to be a transition from LS mode to DS mode. The analyzer 206 can communicate such determination to the sleep mode controller 202, and the sleep mode controller 202 can facilitate transitioning the mobile device 116 from the LS mode to the DS mode.

Figure 3:
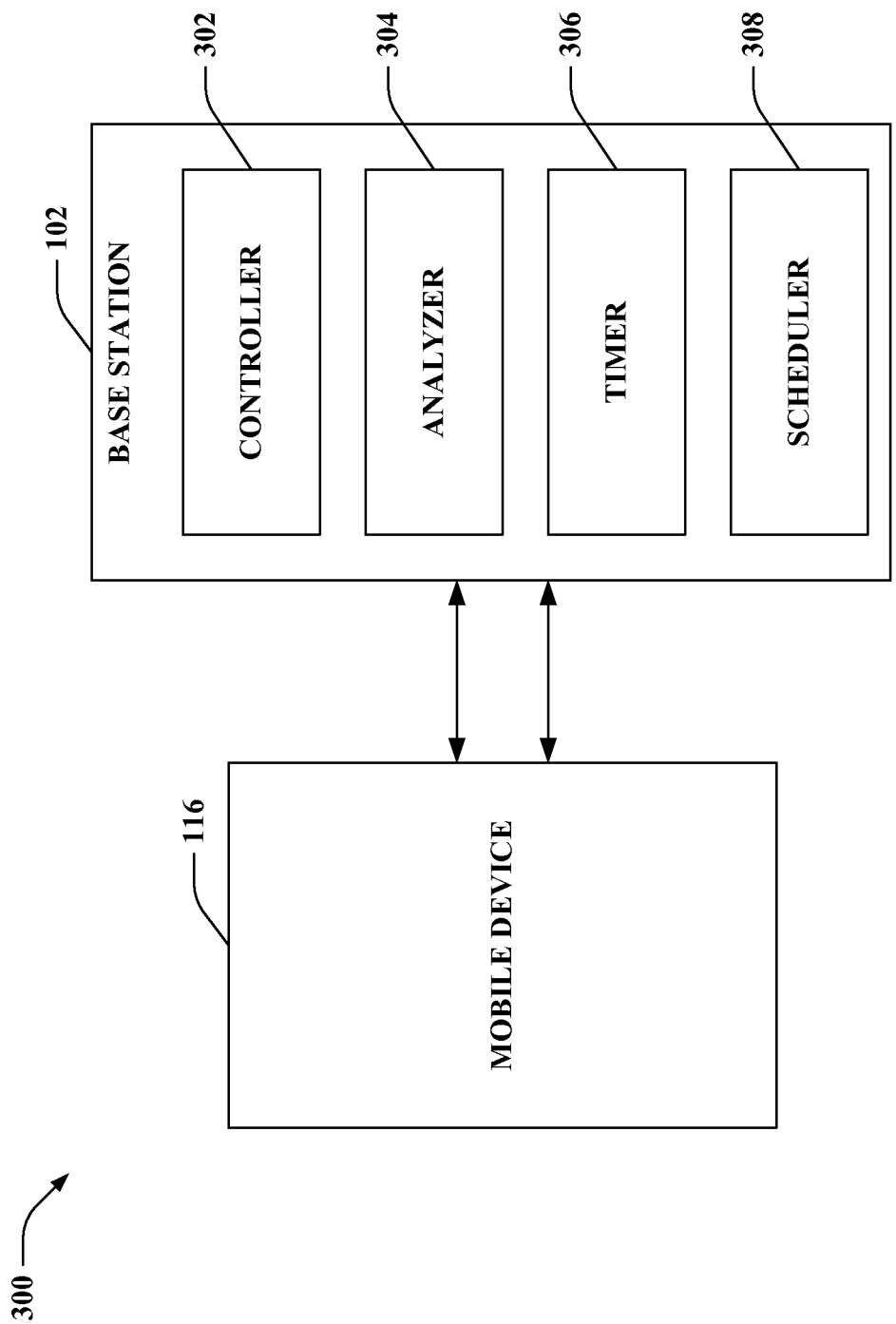
FIG. 3 is an illustration of an example system that can facilitate transitions between different sleep modes associated with a mobile device within a wireless communication environment.

Now referring to FIG. 3, illustrated is a system 300 that can facilitate transitions between different sleep modes associated with a mobile device within a wireless communication environment. System 300 includes a base station 102 that can communicate with one or more mobile devices, such as mobile device 116. It is to be appreciated and understood that only one mobile device is depicted in FIG. 3 for clarity and brevity. Moreover, base station 102 can communicate with other base station(s) and/or any disparate devices (e.g., servers) (not shown) that can perform functions such as, for example, authentication, authorization, accounting, billing, and so forth. The base station 102 and mobile device 116 each can be respectively the same or similar as, and/or can comprise respectively the same or similar functionality as, respective components as more fully described herein, such as, for example, with regard to system 100 and/or system 200.

Base station 102 can include a controller 302 that can facilitate controlling transitions between various sleep modes in the mobile device 116. For example, the controller 302 in conjunction with analyzer 304 can facilitate evaluating and/or comparing information relevant to transition determinations in view of the predefined sleep mode criteria to facilitate determining whether to generate and send an explicit signal (e.g., control message) to the mobile device 116 directing the mobile device 116 to transition from one sleep mode to another mode.

The base station 102 also can include a timer 306 that can track the length of time that has elapsed between data exchanges, or from the last data exchange, between the base station 102 and the mobile device 116. The timer 306 can provide such time information to the controller 302 and/or analyzer 304, and such time information can be evaluated (e.g., compared) in relation to the predefined sleep mode criteria to facilitate determining whether a transition is to be performed.

The base station 102 can also comprise a scheduler 308 that can schedule uplink and/or downlink transmissions between the base station 102 and the mobile device 116. The scheduler 308 can schedule the downlink transmissions to occur when the mobile device 116 is in a "on" period or state (e.g., "on" period of LS mode, or CRX mode which can be in a continuous "on" state). The scheduler 308 also can schedule the uplink transmissions to occur when the mobile device 116 is in a "on" period (e.g., "on" period of LS mode, or CRX mode which can be in a continuous "on" state). The scheduler 308 can facilitate transmitting desired control messages and/or associated data as part of the particular transmission.

Figure 4:
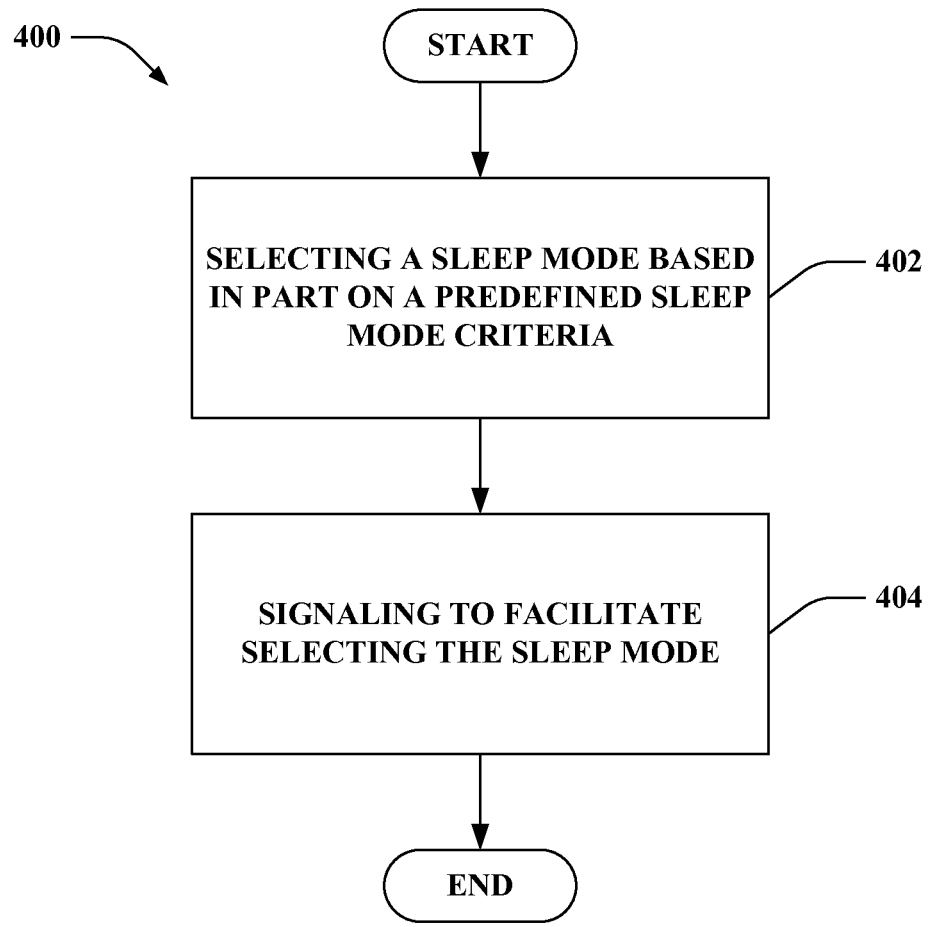
FIG. 4 is an illustration of an example methodology that can facilitate selecting a sleep mode in a mobile device associated with a wireless communication system.
Figure 5:
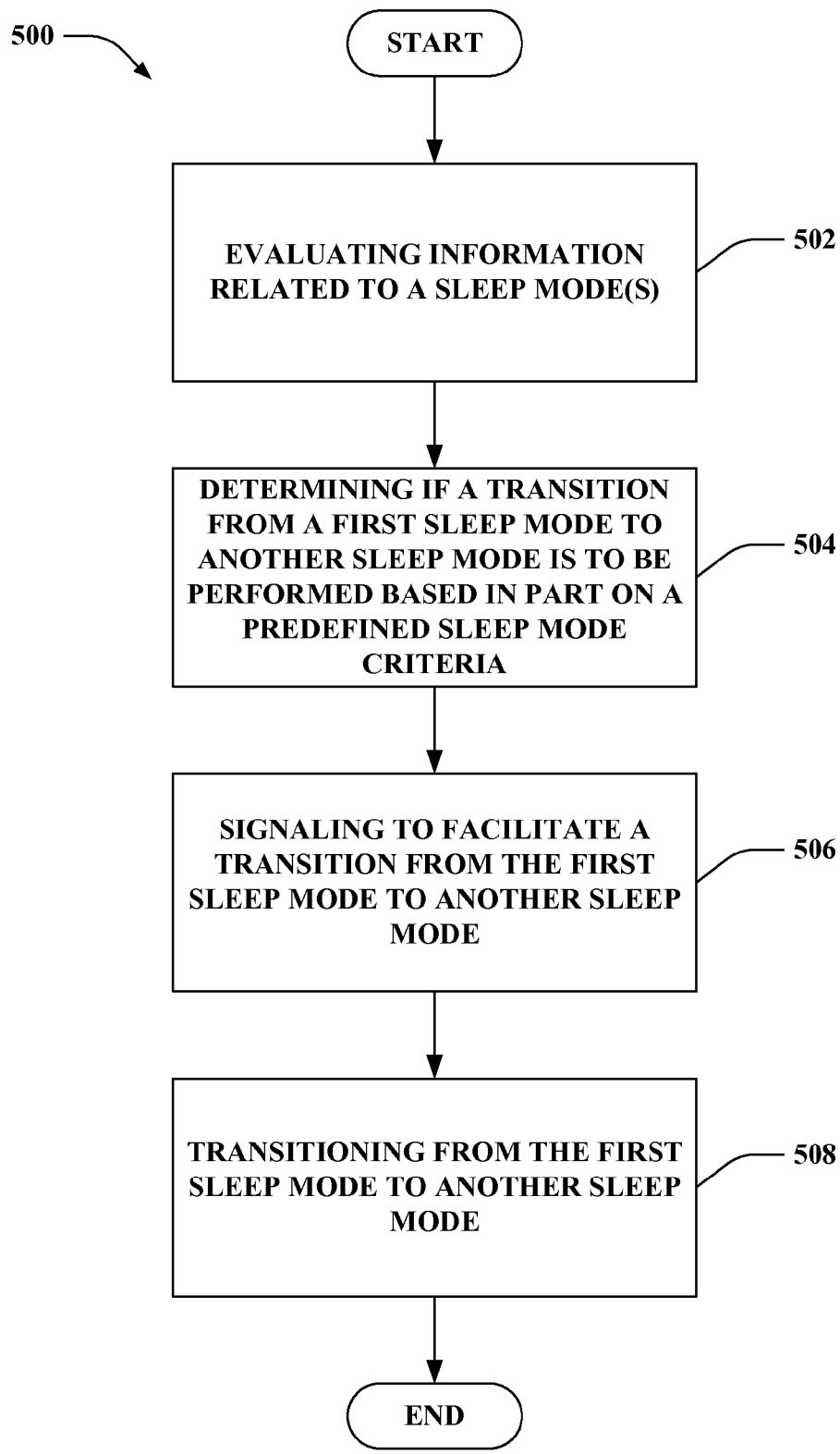
FIG. 5 is an illustration of an example methodology that can facilitate transitioning to a sleep mode in a mobile device associated with a wireless communication system.

Referring to FIGS. 4-5, methodologies relating to selecting sleep modes and/or transitioning between sleep modes associated with a mobile device in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 4, illustrated is a methodology 400 that can facilitate selecting a sleep mode in a mobile device associated with a wireless communication system. At 402, a sleep mode can be selected based in part on a predefined sleep mode criteria. In one aspect, the sleep modes available to be selected can include a LS mode, a DS mode, and/or a non-sleep mode (e.g., CRX mode). The mobile device can facilitate selecting the desired sleep mode. At 404, there can be a signaling to facilitate selecting the sleep mode. For instance, the signaling can be an explicit signaling, such as a control message from the base station (e.g., 102) to a mobile device (e.g., 116), instructing the mobile device to transition from one sleep mode to another sleep mode by selecting another sleep mode; or can be an implicit signaling that can be based in part on a condition being met, such as a predetermined length of time elapsing between the last data exchange between the base station and the mobile device, where the condition(s) can be defined by the predefined sleep mode criteria, for example.

Turning to FIG. 5, illustrated is a methodology 500 that can facilitate transitioning to a sleep mode in a mobile device associated with a wireless communication system. At 502, information related to a sleep mode(s) can be evaluated. In one aspect, an analyzer associated with a mobile device (e.g., 116) or a base station (e.g., 102) can evaluate information related to sleep modes, such as, for example, information related to the elapsed amount of time since the last data exchange between the base station and mobile device. At 504, a determination can be made regarding whether a transition from a first sleep mode to another sleep mode is to be performed, based in part on the predefined sleep mode criteria. For example, the analyzer can make a determination regarding whether to transition from a LS mode to a DS mode after evaluating received information related to sleep modes and comparing such received information to the predefined sleep mode criteria to determine whether a transition condition has been met. At 506, there can be a signal to facilitate a transition from the first sleep mode to another sleep mode. For instance, if it is determined that a transition condition has been met based in part on the received information and/or the predefined sleep mode criteria, an explicit and/or implicit signal can be generated to facilitate transitioning from the first sleep mode to the other sleep mode. An explicit signaling can be a control message from the base station to the mobile device indicating that the mobile device is to transition from the first sleep mode to another sleep mode. An implicit signaling can be, for instance, a certain condition related to the predefined sleep mode criteria being met, where the certain condition being met can indicate (e.g., implicitly signal) to the mobile device and/or base station that the mobile device is to transition from the first sleep mode to another sleep mode. At 508, there can be a transition from the first sleep mode to the other sleep mode. For example, the signal can indicate that the mobile device is to transition from the first sleep mode (e.g., LS mode) to another sleep mode (e.g., DS mode).

It will be appreciated that, in accordance with one or more aspects described herein, inferences can be made regarding selecting sleep modes and/or determining when to transition between sleep modes with respect to a mobile device. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making an inference(s) pertaining to selecting a sleep mode and/or transitioning from one sleep mode to another sleep mode. By way of further illustration, an inference(s) can be made related to determining whether a transition between one sleep mode and another sleep mode is to be performed or has occurred. It will be appreciated that the foregoing examples are illustrative in nature and are not intended to limit the number of inferences that can be made or the manner in which such inferences are made in conjunction with the various embodiments and/or methods described herein.

Figure 6:
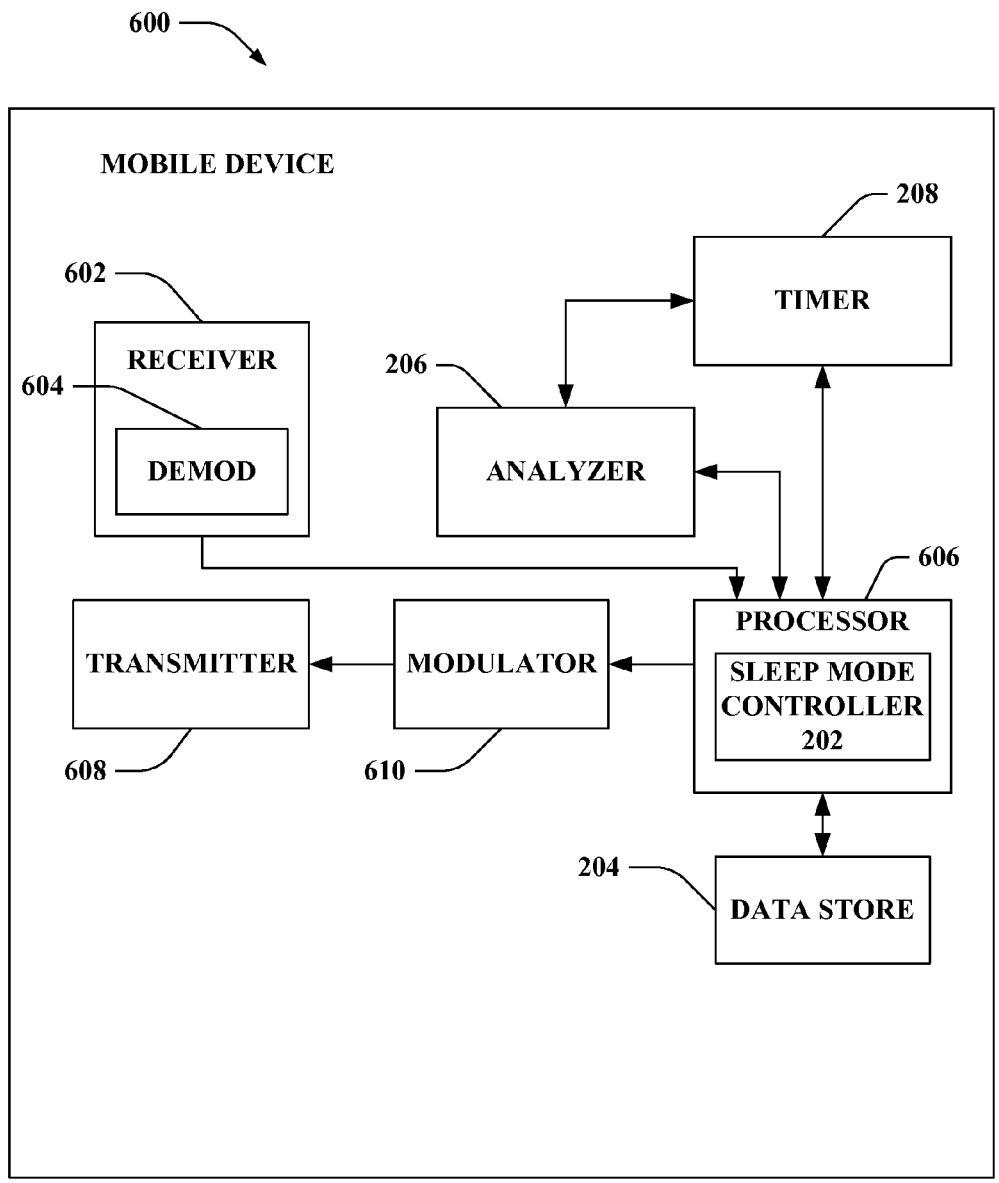
FIG. 6 is an illustration of an example mobile device that can facilitate transitions between sleep modes in a mobile device associated with a wireless communication system.

FIG. 6 is an illustration of a mobile device 600 that can facilitate transitions between sleep modes in a mobile device associated with a wireless communication system. Mobile device 600 comprises a receiver 602 that receives a signal from, for instance, a receive antenna (not shown), and performs typical actions thereon (e.g., filters, amplifies, downconverts, etc.) the received signal and digitizes the conditioned signal to obtain samples. Receiver 602 can be, for example, an MMSE receiver, and can comprise a demodulator 604 that can demodulate received symbols and provide them to a processor 606 for channel estimation. Processor 606 can be a processor dedicated to analyzing information received by receiver 602 and/or generating information for transmission by a transmitter 608, a processor that controls one or more components of mobile device 600, and/or a processor that both analyzes information received by receiver 602, generates information for transmission by transmitter 608, and controls one or more components of mobile device 600. Mobile device 600 can also comprise a modulator 610 that can work in conjunction with the transmitter 608 to facilitate transmitting signals (e.g., data) to, for instance, a base station 102, another mobile device, etc.

The processor 606 can also comprise a sleep mode controller 202 that can facilitate determining and/or controlling transitions between the various sleep modes associated with the mobile device 116. It is to be appreciated and understood that the sleep mode controller 202 can be the same or similar as, or can comprise the same or similar functionality as, respective components such as more fully described herein, for example, with regard to system 200. It is to be further appreciated and understood that the sleep mode controller 202 can be included within the processor 606 (as depicted), can be a stand-alone unit, can be incorporated within another component, and/or virtually any suitable combination thereof, as desired.

Mobile device 600 can additionally comprise data store 204 that can be operatively coupled to processor 606 and can store data to be transmitted, received data, information related to the predefined sleep mode criteria, information (e.g., elapsed time between data exchanges, explicit signals, implicit signals, . . . ) relevant to determinations regarding transitions between the various sleep modes, and any other suitable information that can facilitate determining whether to transition from one sleep mode to another mode. Data store 204 can additionally store protocols and/or algorithms associated with and facilitating determining whether to transition from one sleep mode to another mode. It is to be appreciated that the data store 204 can be the same or similar as, or can comprise the same or similar functionality as, respective components such as more fully described herein, for example, with regard to system 200.

Processor 606 can be operatively coupled to analyzer 206 that can evaluate information, such as information related to determinations regarding transitions between the various sleep modes. It is to be appreciated that the analyzer 206 can be the same or similar as, or can comprise the same or similar functionality as, respective components such as more fully described herein, for example, with regard to system 200. It is to be further appreciated and understood that analyzer 206 can be a stand-alone unit (as depicted), can be included within the processor 606, can be incorporated within another component, and/or virtually any suitable combination thereof, as desired.

Processor 606 also can be operatively coupled to timer 208 that can track the amount of elapsed time between data exchanges, or since the last data exchange, between the mobile device 116 and base station 102 to facilitate determinations regarding transitions between the various sleep modes. It is to be appreciated that the timer 208 can be the same or similar as, or can comprise the same or similar functionality as, respective components such as more fully described herein, for example, with regard to system 200. It is to be further appreciated and understood that timer 208 can be a stand-alone unit (as depicted), can be included within the processor 606, can be incorporated within another component, and/or virtually any suitable combination thereof, as desired.

Figure 7:
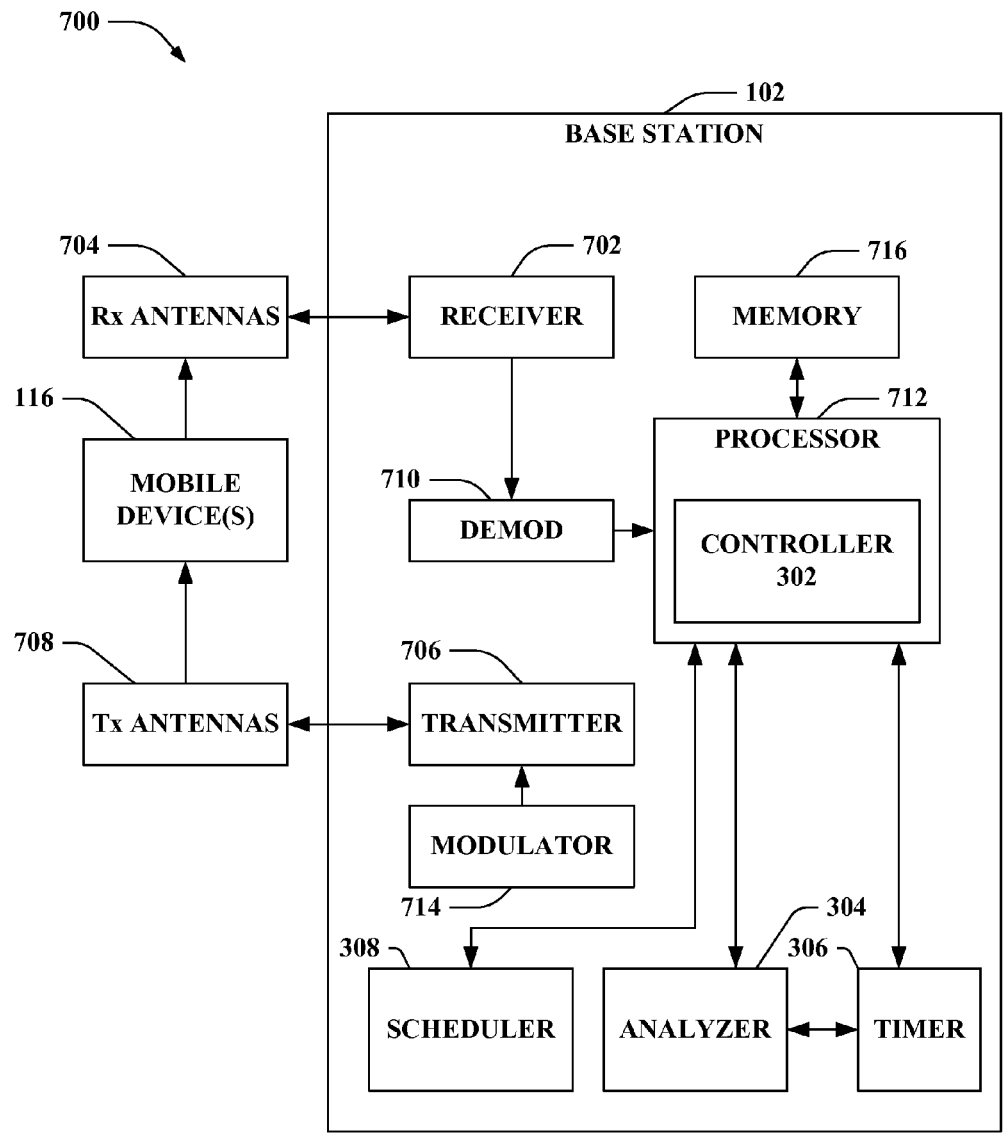
FIG. 7 is an illustration of an example system that can facilitate transitions between sleep modes in a mobile device associated with a wireless communication system.

FIG. 7 is an illustration of a system 700 that can facilitate transitions between sleep modes in a mobile device associated with a wireless communication system. System 700 comprises a base station 102 (e.g., access point, . . . ) with a receiver 702 that can receive signal(s) from one or more mobile devices 116 through a plurality of receive antennas 704, and a transmitter 706 that can transmit signals (e.g., data) to the one or more mobile devices 116 through a transmit antenna 708. Receiver 702 can receive information from receive antennas 704 and can be operatively associated with a demodulator 710 that can demodulate received information. Demodulated symbols can be analyzed by a processor 712 that can be a processor dedicated to analyzing information received by receiver 702 and/or generating information for transmission by a transmitter 706, a processor that controls one or more components of base station 102, and/or a processor that both analyzes information received by receiver 702, generates information for transmission by transmitter 706, and controls one or more components of base station 102. The base station 102 can also comprise a modulator 714 that can work in conjunction with the transmitter 706 to facilitate transmitting signals (e.g., data) to, for instance, a mobile device 116, another device, etc.

Processor 712 can be coupled to a memory 716 that can store information related to data to be transmitted, received data, information related to the predefined sleep mode criteria, information (e.g., elapsed time between data exchanges, explicit signals, implicit signals, . . . ) relevant to determinations regarding transitions between the various sleep modes, and any other suitable information that can facilitate determining whether to transition from one sleep mode to another mode. Memory 716 can additionally store protocols and/or algorithms associated with and facilitating determining whether to the mobile device 116 is to transition from one sleep mode to another mode.

Processor 712 can be and/or can comprise controller 302 that can facilitate making determinations associated with transitions between various sleep modes in a mobile device 116. It is to be appreciated and understood that the controller 302 can be the same or similar as, or can comprise the same or similar functionality as, respective components such as more fully described herein, for example, with regard to system 300. It is to be further appreciated and understood that the controller 302 can be included within the processor 712 (as depicted), can be a stand-alone unit, can be incorporated within another component, and/or virtually any suitable combination thereof, as desired.

Processor 712 can be coupled to an analyzer 304 that can evaluate information related to the mobile device 116, such as information relevant to determinations regarding transitions between various sleep modes in the mobile device 116, and can analyze predefined sleep mode criteria to facilitate determining whether a mobile device 116 is to be transitioned from one sleep mode to another mode. The analyzer 304 can receive information obtained from the mobile device 116 and/or information (e.g., elapsed time information related to data exchanges) generated within the base station 102, and such information can be evaluated to facilitate making transition determinations. It is to be appreciated that the analyzer 304 can be the same or similar as, or can comprise the same or similar functionality as, respective components such as more fully described herein, for example, with regard to system 300. It is to be further appreciated and understood that analyzer 304 can be a stand-alone unit (as depicted), can be included within the processor 712, can be incorporated within another component, and/or virtually any suitable combination thereof, as desired.

Processor 712 can be operatively coupled to timer 306 that can track the amount of elapsed time between data exchanges, or since the last data exchange, between the mobile device 116 and base station 102 to facilitate determinations regarding transitions between the various sleep modes. It is to be appreciated that the timer 306 can be the same or similar as, or can comprise the same or similar functionality as, respective components such as more fully described herein, for example, with regard to system 300. It is to be further appreciated and understood that timer 306 can be a stand-alone unit (as depicted), can be included within the processor 712, can be incorporated within another component, and/or virtually any suitable combination thereof, as desired.

Processor 712 also can be operatively coupled to scheduler 308 that can schedule data transmissions (e.g., uplinks, downlinks) between the base station 102 and a mobile device 116. It is to be appreciated that the scheduler 308 can be the same or similar as, or can comprise the same or similar functionality as, respective components such as more fully described herein, for example, with regard to system 300. It is to be further appreciated and understood that scheduler 308 can be a stand-alone unit (as depicted), can be included within the processor 712, can be incorporated within another component, and/or virtually any suitable combination thereof, as desired.

Figure 8:
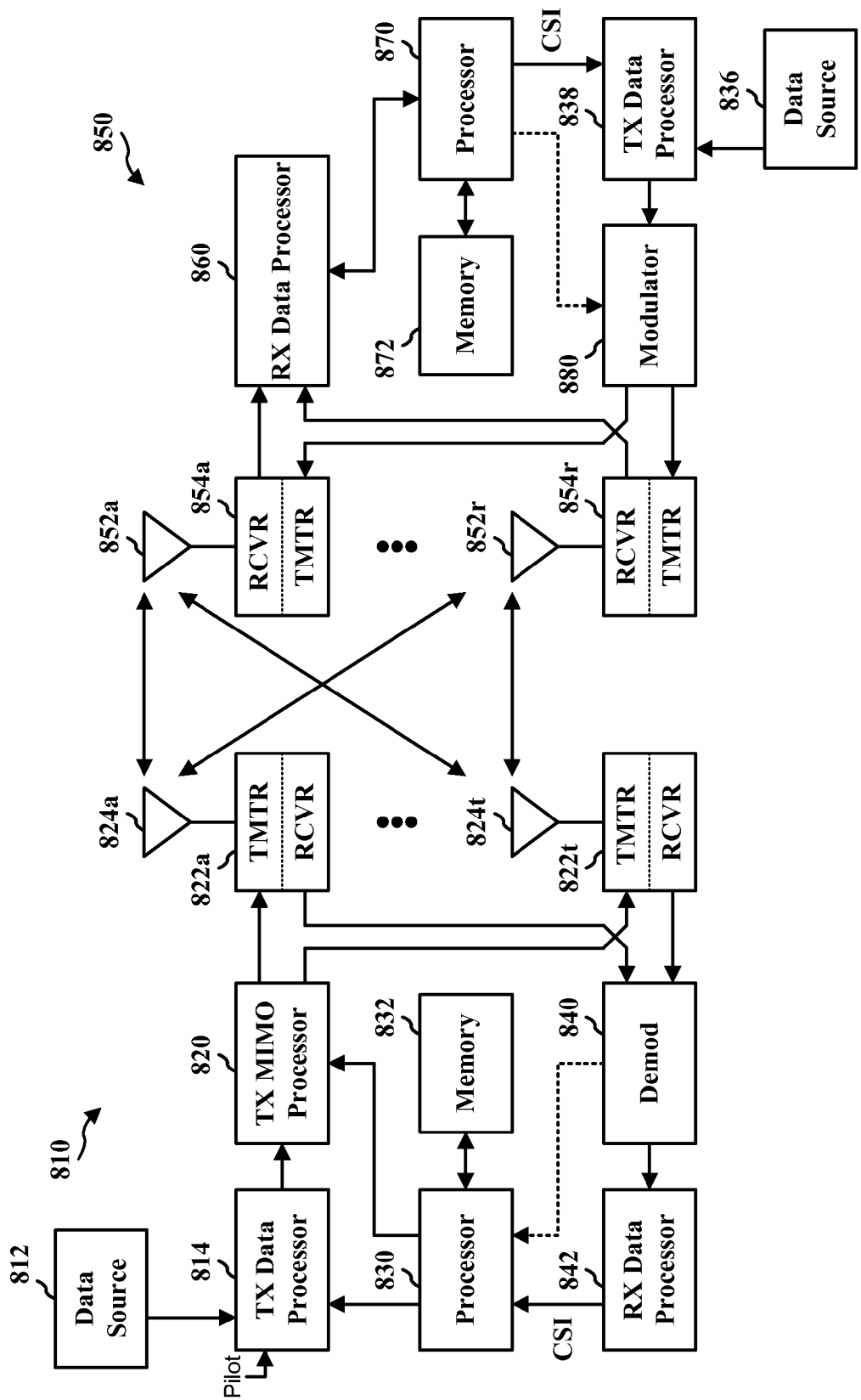
FIG. 8 is an illustration of an example wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-3, 6-7, and 9-10) and/or methods (FIGS. 4-5) described herein to facilitate wireless communication there between. It is to be appreciated that base station 810 and mobile device 850 each can be respectively the same or similar as, and/or can comprise respectively the same or similar functionality as, respective components as more fully described herein, such as, for example, with regard to system 100, system 200, system 300, system 600, and/or system 700.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which precoding matrix to use (discussed below). Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message and can determine which precoding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

In an aspect, logical channels are classified into Control Channels and Traffic Channels. Logical Control Channels can comprise Broadcast Control Channel (BCCH) which is DL channel for broadcasting system control information. Paging Control Channel (PCCH) which is DL channel that transfers paging information. For instance, PCCH can be utilized when the network does not know the location cell of the UE. Common control channel (CCCH) which is a channel that can be utilized for transmitting control information between UEs and the network. This channel can be used by the UEs having no RRC connection with the network. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+ MSCH). It is noted that it is FFS how MBMS is transmitted by either L2/3 signaling on MCCH or L1 signaling. Dedicated Control Channel (DCCH) is Point-to-point bi-directional channel that transmits dedicated control information and used by UEs having an RRC connection. In aspect, Logical Traffic Channels can comprise a Dedicated Traffic Channel (DTCH) which is Point-to-point bi-directional channel, dedicated to one UE, for the transfer of user information. A DTCH can be used in both UL and DL. Also, a Multicast Traffic Channel (MTCH) for Point-to-multipoint DL channel for transmitting traffic data. This channel can be used by UEs that receive MBMS.

In an aspect, Transport Channels are classified into DL and UL. DL Transport Channels comprise a Broadcast Channel (BCH), a Downlink Shared Data Channel (DL-SDCH), a Paging Channel (PCH), and a Multicast Channel (MCH). A BCH can be characterized by a fixed-predefined format and can be broadcast in the entire coverage area of the cell. A DL-SDCH can be characterized by having support for hybrid automatic repeat request (HARQ); support for dynamic link adaptation by varying the modulation, coding, and transmit power; ability to be broadcast in the entire cell; ability to use beamforming; support for both dynamic and semi-static resource allocation; support for UE discontinuous reception (DRX) to enable UE power saving; support for MBMS transmission. It is noted that the ability to utilize slow power control can be based in part on the physical layer. The PCH can be characterized by having support of UE power saving (DRX cycle is indicated by the network to the UE); ability to be broadcast in the entire coverage area of the cell, and can be mapped to physical resources which can be used dynamically for traffic channels or other control channels. The MCH can be characterized by having ability to be broadcast in the entire coverage area of the cell; support for MBSFN combining of MBMS transmission on multiple cells; and support for semi-static resource allocation (e.g., with a time frame of a long cyclic prefix. The UL Transport Channels comprise a an Uplink Shared Channel (UL-SCH), a Random Access Channel (RACH), and plurality of PHY channels. The UL-SCH can be characterized by having ability to use beamforming; support for dynamic link adaptation by varying the transmit power and potentially modulation and coding; support for HARQ; support for both dynamic and semi-static resource allocation. It is noted that the possibility to use UL synchronization and timing advance can depend in part on the physical layer. The RACH can be characterized by having limited control information, and collision risk. It is noted that the possibility to use open loop power control can depend in part on the physical layer solution. The PHY channels comprise a set of DL channels and UL channels.

The PHY channels (e.g., of E-ULTRA) can be: Physical broadcast channel (PBCH), the coded BCH transport block can be mapped to four subframes within a 40 ms interval, 40 ms timing can be blindly detected (e.g., there is no explicit signaling indicating 40 ms timing, each subframe can be assumed to be self-decodable (e.g., the BCH can be decoder from a single reception, assuming sufficiently good channel conditions; Physical control format indicator channel (PC-FICH) that can inform the UE about the number of OFDM symbols used for PDCCHs, and can be transmitted in every subframe; Physical downlink control channel (PDCCH) that can inform the US about the resource allocation of PCH and DL-SCH, and hybrid ARQ information related to DL-SCH, and can carry the uplink scheduling grant; Physical hybrid ARQ indicator channel (PHICH) that can carry hybrid ARQ ACK/NAKs in response to uplink transmissions; Physical downlink shared channel (PDSCH) that can carry DL-SCH and PCH; Physical multicast channel (PMCH) that can carry the MCH; Physical uplink control channel (PUCCH) that can carry hybrid ARQ ACK/NAKs in response to downlink transmission, can carry scheduling (SR), and can carry CQI reports; Physical uplink shared channel (PUSCH) that can carry the UL-SCH; and Physical random access channel (PRACH) that can carry the random access preamble.

In an aspect, a channel structure is provided that preserves low PAR (at any given time, the channel is contiguous or uniformly spaced in frequency) properties of a single carrier waveform.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
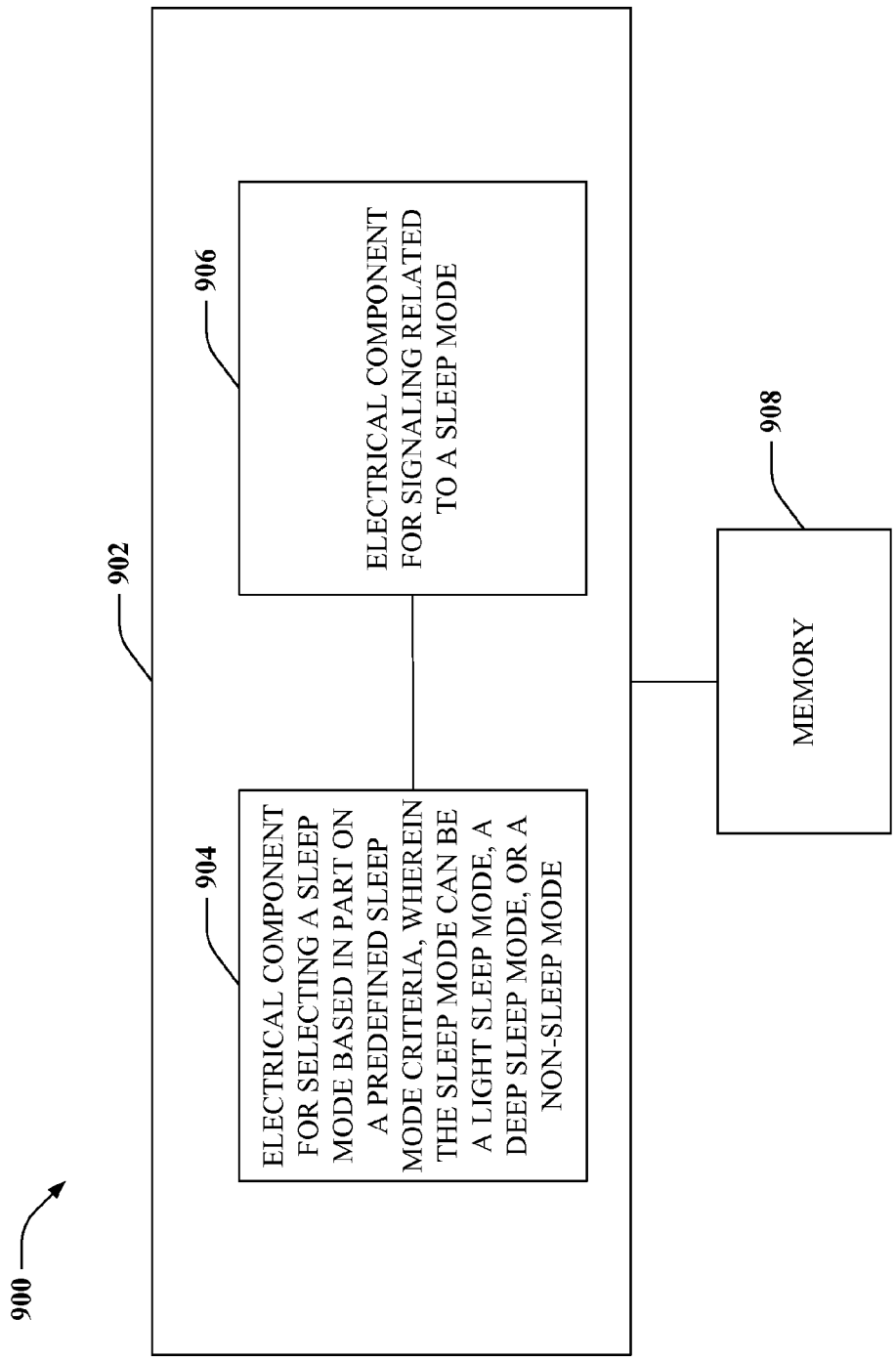
FIG. 9 is an illustration of an example system that can facilitate transitions between different sleep modes in a mobile device associated with a wireless communication environment.

With reference to FIG. 9, illustrated is a system 900 that can facilitate transitions between different sleep modes in a mobile device associated with a wireless communication environment. For example, system 900 can reside at least partially within a mobile device (e.g., 116). It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction.

For instance, logical grouping 902 can include an electrical component for selecting a sleep mode based in part on a predefined sleep mode criteria, wherein the sleep mode can be a LS mode, a DS mode, or a non-sleep mode (e.g., CRX mode) 904. For instance, the selecting of a sleep mode can involve switching from one sleep mode to another sleep mode. In accordance with an aspect, the non-sleep mode can be considered a special mode associated with the LS mode, where, for the non-sleep mode, the "off" period can be set to 0, so that the mobile device (e.g., 116) can be in an "on" state continuously. Further, logical grouping 902 can comprise an electrical component for signaling related to a sleep mode 906. For example, the signaling can comprise explicit signaling (e.g., control signal) and/or implicit signaling (e.g., a predefined condition associated with the predefined sleep mode criteria has been met). Additionally, system 900 can include a memory 908 that retains instructions for executing functions associated with electrical components 904 and 906. While shown as being external to memory 908, it is to be understood that one or more of electrical components 904 and 906 can exist within memory 908.

Figure 10:
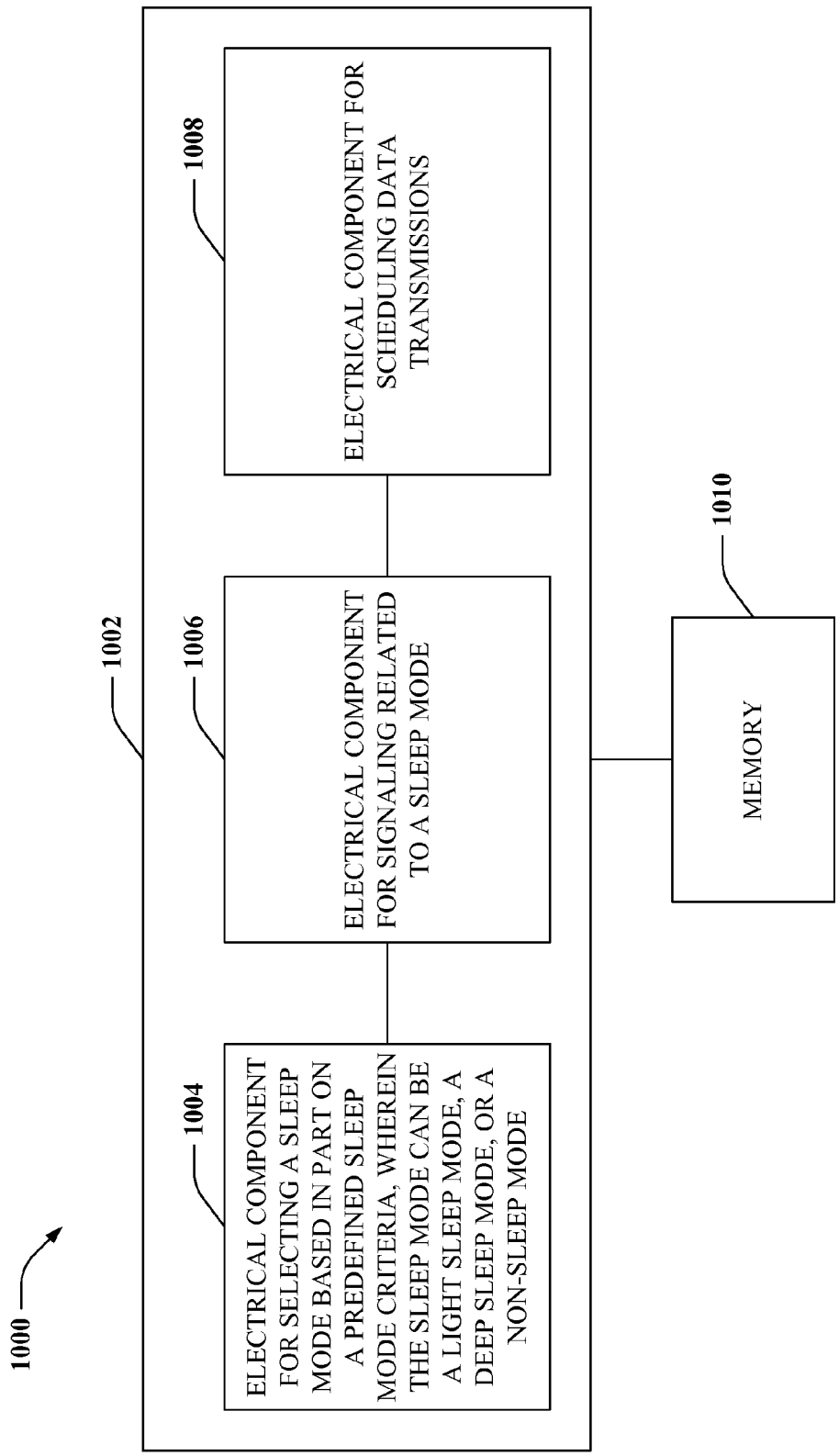
FIG. 10 is an illustration of an example system that can facilitate transitions between different sleep modes in a mobile device associated with a wireless communication environment.

Turning to FIG. 10, illustrated is a system 1000 that can facilitate transitions between different sleep modes in a mobile device associated with a wireless communication environment. System 1000 can reside within a base station (e.g., 102), for instance. As depicted, system 1000 includes functional blocks that can represent functions implemented by a processor, software, or combination thereof (e.g., firmware). System 1000 includes a logical grouping 1002 of electrical components that can act in conjunction. Logical grouping 1002 can include can include an electrical component for selecting a sleep mode based in part on a predefined sleep mode criteria, wherein the sleep mode can be a LS mode, a DS mode, or a non-sleep mode (e.g., CRX mode) 1004. For instance, the selecting of a sleep mode can involve switching from one sleep mode to another sleep mode in a mobile device (e.g., 116) associated with the base station. In accordance with an aspect, the non-sleep mode can be considered a special mode associated with the LS mode, where, for the non-sleep mode, the "off" period can be set to 0, so that the mobile device (e.g., 116) can be in an "on" state continuously. Further, logical grouping 1002 can comprise an electrical component for signaling related to a sleep mode 1006. For example, the signaling can comprise explicit signaling (e.g., control signal) and/or implicit signaling (e.g., a predefined condition associated with the predefined sleep mode criteria has been met). Moreover, logical grouping 1002 can include an electrical component for scheduling data transmissions 1008. For instance, the scheduling of data transmissions can relate to uplink and downlink transmissions of data and/or control information between the base station and a mobile device. The scheduling of data transmissions can be such that the data transmissions can be performed at times when a mobile device is in an "on" period for a downlink transmission and/or an "on" period for an uplink transmission. The scheduling of data transmissions can be based in part on the sleep mode associated with the mobile device (e.g., 116). Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of wireless communication, performed on a mobile device, the method comprising:
   receiving wireless signalling including discontinuous reception (DRX) configuration parameters,
      the DRX configuration parameters defining a DRX configuration of the mobile device, and
      the DRX configuration parameters including a timer value defining a configurable amount of time;
   implicitly activating, after receiving the DRX configuration parameters and based on the mobile device not transmitting and/or receiving data for the configurable amount of time, the DRX configuration of the mobile device; and
   transitioning, based on DRX configuration parameters, from a first state to a second state.

2. The method of claim 1, in which implicitly activating the DRX configuration comprises:
   transitioning the mobile device from a continuous reception (CRX) mode to a DRX mode.

3. The method of claim 2, in which the DRX mode is a light sleep mode.

4. The method of claim 1, further comprising:
   storing the DRX configuration parameters by the mobile device.

5. The method of claim 1, in which implicitly activating the DRX configuration comprises:
   implicitly activating the DRX configuration without receiving an explicit DRX activation signal from a base station.

6. An apparatus for wireless communication, comprising:
   means for receiving wireless signalling including discontinuous reception (DRX) configuration parameters from an eNodeB,
      the DRX configuration parameters defining a DRX configuration of a mobile device, and
      the DRX configuration parameters including a timer value defining a configurable amount of time;
   means for implicitly activating, after receiving the DRX configuration parameters when the mobile device does not transmit and/or receive data for the configurable amount of time, the DRX configuration of the mobile device; and
   means for transitioning, based on DRX configuration parameters, from a first state to a second state.

7. The apparatus of claim 6, in which the means for implicitly activating the DRX configuration comprise:
   means for transitioning the mobile device from a continuous reception (CRX) mode to a DRX mode.

8. The apparatus of claim 7, in which the DRX mode is a light sleep mode.

9. The apparatus of claim 6, in which the means for implicitly activating the DRX configuration comprise:
   means for implicitly activating the DRX configuration without receiving an explicit DRX activation signal from a base station.

10. The apparatus of claim 6, further comprising:
means for storing the DRX configuration parameters by the mobile device.

11. A non-transitory computer-readable medium having program code recorded thereon, the program code comprising:
program code to receive wireless signalling including discontinuous reception (DRX) configuration parameters,
the DRX configuration parameters defining a DRX configuration of a mobile device, and
the DRX configuration parameters including a timer value defining a configurable amount of time;
program code to implicitly activate, after receiving the DRX configuration parameters when the mobile device does not transmit and/or receive data for the configurable amount of time, the DRX configuration of the mobile device; and
program code to transition, based on DRX configuration parameters, from a first state to a second state.

12. The non-transitory computer-readable medium of claim 11, in which the program code to implicitly activate the DRX configuration comprises:
program code to transition the mobile device from a continuous reception (CRX) mode to a DRX mode.

13. The non-transitory computer-readable medium of claim 12, in which the DRX mode is a light sleep mode.

14. The non-transitory computer-readable medium of claim 11, in which the program code further comprises:
program code to store the DRX configuration parameters.

15. The non-transitory computer-readable medium of claim 11, in which the program code to implicitly activate the DRX configuration comprises:
program code to implicitly activate the DRX configuration without receiving an explicit DRX activation signal from a base station.

16. An apparatus operable in a wireless communication system, the apparatus comprising:
a memory; and
at least one processor coupled to the memory and configured:
to receive wireless signalling including discontinuous reception (DRX) configuration parameters,
the DRX configuration parameters defining a DRX configuration of the apparatus, and
the DRX configuration parameters including a timer value defining a configurable amount of time; and
to implicitly activate, after receiving the DRX configuration parameters when the apparatus does not transmit and/or receive data for the configurable amount of time, the DRX configuration of the apparatus; and
to transition, based on DRX configuration parameters, from a first state to a second state.

17. The apparatus of claim 16, in which the at least one processor, when implicitly activating the DRX configuration, is configured:
to transition the apparatus from a continuous reception (CRX) mode to a DRX mode.

18. The apparatus of claim 17, in which the DRX mode is a light sleep mode.

19. The apparatus of claim 16, in which the at least one processor is configured:
to store the DRX configuration parameters.

20. The apparatus of claim 16, in which the processor, when implicitly activating the DRX configuration, is configured:
to implicitly activate the DRX configuration without receiving an explicit DRX activation signal from a base station.

* * * * *